US008321229B2

(12) United States Patent
Choo et al.

(10) Patent No.: US 8,321,229 B2
(45) Date of Patent: Nov. 27, 2012

(54) APPARATUS, MEDIUM AND METHOD TO ENCODE AND DECODE HIGH FREQUENCY SIGNAL

(75) Inventors: Ki-hyun Choo, Seoul (KR); Eun-mi Oh, Seongnam-si (KR); Ho-sang Sung, Yongin-si (KR); Jung-hoe Kim, Seongnam-si (KR); Mi-young Kim, Hwaswong-si (KR)

(73) Assignee: Samsung Electronics Co., Ltd., Suwon-si ( * ) Notice: Subject to any disclaimer, the term of this patent is extended or adjusted under 35 U.S.C. 154(b) by 896 days.

(21) Appl. No.: 12/256,704

(22) Filed: Oct. 23, 2008

(65) Prior Publication Data

US 2009/0110208 A1 Apr. 30, 2009

(30) Foreign Application Priority Data

Oct. 30, 2007 (KR) ........................ 10-2007-0109823

(51) Int. Cl.
*G06F 15/00* (2006.01)
*G10L 19/00* (2006.01)
*G10L 21/00* (2006.01)

(52) U.S. Cl. ......... 704/500; 704/200; 704/501; 704/502

(58) Field of Classification Search ........... 704/500–502
See application file for complete search history.

(56) References Cited

U.S. PATENT DOCUMENTS 5,150,387 A * 9/1992 Yoshikawa et al. ........... 375/240
6,708,145 B1 * 3/2004 Liljeryd et al. ............ 704/200.1
6,895,375 B2 * 5/2005 Malah et al. .................. 704/219
7,003,451 B2 * 2/2006 Kjorling et al. ............... 704/206
7,433,817 B2 * 10/2008 Kjorling et al. ............... 704/229
7,469,206 B2 * 12/2008 Kjorling et al. ............... 704/205
8,015,368 B2 * 9/2011 Sharma et al. ................ 711/147
2002/0087304 A1 * 7/2002 Kjorling et al. ............... 704/219
2004/0138876 A1 7/2004 Kallio et al.
2005/0096917 A1 * 5/2005 Kjorling et al. ............... 704/500
2006/0031075 A1 * 2/2006 Oh et al. ....................... 704/500
2006/0036432 A1 * 2/2006 Kjorling et al. ............... 704/206
2008/0126102 A1 * 5/2008 Shirakawa et al. ........... 704/500
2008/0219344 A1 * 9/2008 Suzuki et al. ............ 375/240.01
2008/0288262 A1 * 11/2008 Makiuchi et al. ............. 704/500

FOREIGN PATENT DOCUMENTS

WO 00/45379 8/2000

OTHER PUBLICATIONS

European Search Report issued Jan. 20, 2010 in EP Application No. 08167938.3.

Ehrer A et al: "Audio Coding technology of ExAC" Intelligent Multimedia, Video and Speech Processing, 2004. Proceedings of 2004 International Symposium on Hong Kong. China Oct. 20-22, 2004, Piscataway, NJ, USA IEEE, Oct. 20, 2004, pp. 290-293, XP010801441.

* cited by examiner

*Primary Examiner* — Justin Rider
(74) *Attorney, Agent, or Firm* — Stanzione & Kim, LLP

(57) ABSTRACT

A method and apparatus to encoding or decoding an audio signal is provided. In the method and apparatus, a noise-floor level to use in encoding or decoding a high frequency signal is updated according to the degree of a voiced or unvoiced sound included in the signal.

29 Claims, 18 Drawing Sheets

APPARATUS, MEDIUM AND METHOD TO ENCODE AND DECODE HIGH FREQUENCY SIGNAL

CROSS-REFERENCE TO RELATED APPLICATIONS

This application claims the benefit of Korean Patent Application No. 10-2007-0109823, filed on Oct. 30, 2007, in the Korean Intellectual Property Office, the disclosure of which is incorporated herein in its entirety by reference.

BACKGROUND OF THE INVENTION

1. Field of the Invention

One or more embodiment of the present general inventive concept relates to encoding or decoding an audio signal, and more particularly, to a method and apparatus to encode or decode a high frequency signal contained in a band of frequencies which is greater than a predetermined frequency.

2. Description of the Related Art

Audio signals, such as speech signals or music signals, can be divided into low frequency signals contained in a band of frequencies that is less than a predetermined frequency and high frequency signals contained in a band of frequencies that is greater than the predetermined frequency. Since high frequency signals are less important in human sound perception than low frequency signals due to human hearing characteristics, generally, a small number of bits are allocated to high frequency signals when encoding an audio signal. Spectral Band Replication (SBR) is an example of a technique of encoding/decoding an audio signal using this concept. In SBR, an encoder encodes a high frequency signal by using a low frequency signal, and a decoder decodes the encoded high frequency signal by using a decoded low-frequency signal. However, when a high frequency signal is produced by simply replicating a low frequency signal and then decoded as in the conventional art, a high frequency signal obtained by the decoding differs from the high frequency signal of the original signal, and thus sound quality is greatly diminished.

Traditionally, a difference between the characteristics of the original high-frequency signal and a restored high-frequency signal is compensated using an adaptive whitening filter or a noise-floor. When the high frequency signal to be restored is tonal, but has a strong inclination toward noise, an adaptive whitening filter changes the inclination of the high frequency signal toward noise by using an inverse-filtering process. By using a noise-floor, noise is added to the high frequency signal to reduce a difference between tonalities of a high frequency signal to be restored and the original high-frequency signal.

SUMMARY OF THE INVENTION

One or more embodiment of the present general inventive concept provides an apparatus and method of encoding or decoding a high frequency signal contained in a band of frequencies which are greater than a predetermined frequency.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a high frequency signal encoding method including calculating a noise-floor level of a high frequency signal in a band of frequencies that is greater than a predetermined frequency, updating the noise-floor level of the high frequency signal by an amount corresponding to an amount of a voiced or unvoiced sound included in a low frequency signal in a band of frequencies that is less than the predetermined frequency, and encoding the updated noise-floor level.

The foregoing and/or other aspects and utilities of the present general inventive concept may also be achieved by providing a high frequency signal decoding method including decoding a noise-floor level of a high frequency signal in a band of frequencies that is greater than a predetermined frequency, the noise floor level corresponding to an amount of a voiced or an unvoiced sound included in a low frequency signal in a band of frequencies less than the predetermined frequency, generating a noise signal according to the decoded noise-floor level, generating the high frequency signal from the low frequency signal, and adding the noise signal to the high frequency signal.

The foregoing and/or other aspects and utilities of the present general inventive concept may also be achieved by providing a computer readable recording medium having recorded thereon computer instructions that, when executed by a computer processor, perform a high frequency signal encoding method including calculating a noise-floor level of a high frequency signal in a band of frequencies that is greater than a predetermined frequency, updating the noise-floor level of the high frequency signal by an amount corresponding to an amount of a voiced or unvoiced sound included in the high frequency signal, and encoding the updated noise-floor level.

The foregoing and/or other aspects and utilities of the present general inventive concept may also be achieved by providing a computer readable recording medium having recorded thereon computer instructions that, when executed by a computer processor, perform a high frequency signal decoding method including decoding a noise-floor level of a high frequency signal in a band of frequencies that is greater than a predetermined frequency, the noise-floor level corresponding to an amount of a voiced or unvoiced sound included in a low-frequency signal in a band of frequencies that is less than the predetermined frequency, generating a noise signal according to the noise-floor level, generating the high frequency signal from the low frequency signal, and adding the noise signal to the high frequency signal.

The foregoing and/or other aspects and utilities the present general inventive concept may also be achieved by providing a high frequency signal encoding apparatus including a calculation unit to calculate a noise-floor level of a high frequency signal in a band of frequencies that is greater than a predetermined frequency, an updating unit to update the noise-floor level of the high frequency signal in accordance with an amount of a voiced or unvoiced sound included in the low frequency signal, and an encoding unit to encode the updated noise-floor level.

The foregoing and/or other aspects and utilities of the present general inventive concept may also be achieved by providing a high frequency signal decoding apparatus including a decoding unit to decode a noise-floor level of a high frequency signal in a band of frequencies that is greater than a predetermined frequency, the noise floor level corresponding to an amount of a voiced or unvoiced sound included in a low frequency signal in a band of frequencies that is less than the predetermined frequency, a high frequency signal decoder to reproduce the high frequency signal from the low frequency signal, a noise generation unit to generate a noise signal according to the decoded noise-floor level, and a noise addition unit to add the generated noise signal to the reproduced high frequency signal.

The foregoing and/or other aspects and utilities of the present general inventive concept may also be achieved by providing an audio signal encoder including a voicing level calculating unit to determine an amount of voiced sound content in a frequency band of an audio signal, an encoding unit to encode the frequency band such that another frequency band of the audio signal can be generated therefrom, a noise-floor level encoding unit to encode a noise-floor level of the other frequency band based on the amount of voiced sound content in the frequency band, and a multiplexer to generate a bitstream from at least the encoded noise floor level and the encoded frequency band.

The foregoing and/or other aspects and utilities of the present general inventive concept may also be achieved by providing an audio signal decoder including a demultiplexer to separate from a bitstream at least an encoded noise floor level and an encoded frequency band of the audio signal other than a frequency band from which the noise floor level was encoded, the noise floor level being of a level determined from a voicing level of the frequency band other than the frequency band from which the noise floor was encoded, a noise generation unit to generate a noise signal in accordance with the decoded noise floor level, a decoding unit to decode the frequency band and to generate the other frequency band therewith, and a noise addition unit to add the noise signal to the other frequency band of the audio signal.

The foregoing and/or other aspects and utilities of the present general inventive concept may also be achieved by providing a system to convey an audio signal across a transmission medium, the system including an encoder to encode a frequency band of the audio signal and to encode side data to generate another frequency band from the frequency band, the side data including a noise floor level of the other frequency band adjusted by an amount corresponding to an amount of a voiced sound in the frequency band, and a decoder to decode the audio signal from the encoded audio signal data and the side data.

The foregoing and/or other aspects and utilities of the present general inventive concept may also be achieved by providing a method to convey an audio signal across a transmission medium by encoding a frequency band of the audio signal and side data to generate another frequency band from the frequency band, the side data including a noise floor level of the other frequency band adjusted by an amount corresponding to an amount of a voiced sound contained in the frequency band, and decoding the audio signal from the encoded audio signal data and the side data.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
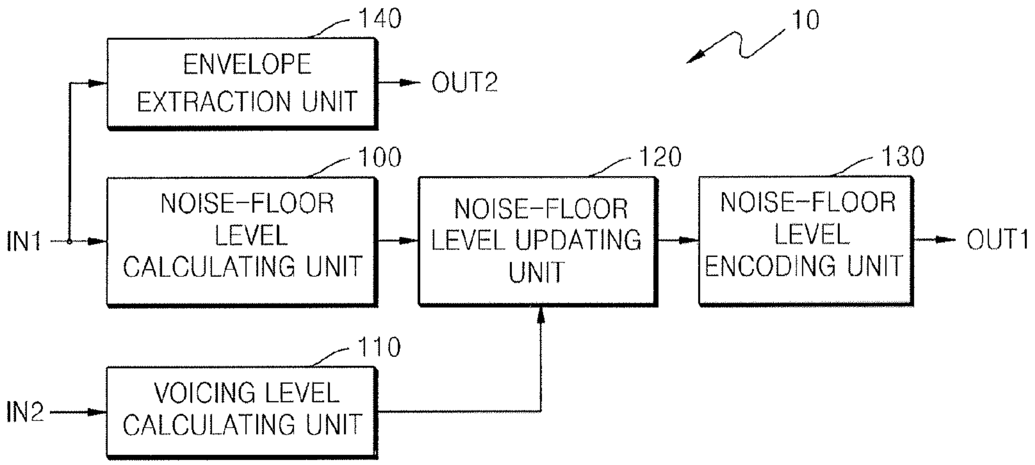
FIG. 1 is a block diagram of a high frequency signal encoding apparatus according to an embodiment of the present general inventive concept.

An apparatus and method of encoding and decoding a high frequency signal according to the present general inventive concept will now be described more fully with reference to the accompanying drawings, wherein like reference numerals refer to like elements throughout, in which exemplary embodiments of the general inventive concept are illustrated. The embodiments are described below in order to explain the present general inventive concept by referring to the figures.

First, exemplary encoding apparatuses according to embodiments of the present general inventive concept will now be described.

FIG. 1 is a block diagram of an exemplary high frequency signal encoding apparatus 10 according to an embodiment of the present general inventive concept. Referring to FIG. 1, the exemplary high frequency signal encoding apparatus 10 includes a noise-floor level calculating unit 100, a voicing level calculating unit 110, a noise-floor level updating unit 120, a noise-floor level encoding unit 130, and an envelope extraction unit 140.

The noise-floor level calculating unit 100 calculates a noise-floor level of a high frequency signal contained in a band of frequencies greater than a predetermined frequency. The calculated noise-floor level is the amount of noise that is to be added to a high frequency band of the audio signal restored by a decoder.

The noise-floor level calculating unit 100 may calculate, as the noise-floor level, a difference between minimum points on a spectral envelope of a high-frequency signal spectrum and maximum points on the spectral envelope of the high-frequency signal spectrum. Alternatively, the noise-floor level calculating unit 100 may calculate the noise-floor level by comparing the tonality of the high-frequency signal with the tonality of a low frequency signal contained in a band of frequencies less than the predetermined frequency, where the low frequency signal is used in encoding the high-frequency signal. When the noise-floor level calculating unit 100 calculates the noise-floor level in this manner, the noise-floor level is established such that when a greater tonality is found to be in the high-frequency signal as compared to that of the low-frequency signal, a proportional amount of noise can be applied to the high-frequency signal at a decoder. The difference in tonality may be determined by, for example, spectral analysis of the high frequency band data and the low frequency band spectral data input at IN1 of the high-frequency signal encoding unit 10, as illustrated in FIG. 1.

The voicing level calculating unit 110 calculates a voicing level of the low-frequency signal. The voicing level is a measure of whether a voiced sound or an unvoiced sound is predominant in the low-frequency signal. In other words, the voicing level denotes a degree to which the low-frequency signal contains a voiced or unvoiced sound. Hereinafter, the embodiment illustrated in FIG. 1 will be described based on the assumption that the voicing level is measured according to a voiced sound.

The voicing level calculating unit 110 may calculate the voicing level by using a pitch lag correlation value or a pitch prediction gain value. The voicing level calculating unit 110 may calculate the voicing level by receiving at input IN2, for example, the pitch correlation value or the pitch prediction gain value, and normalizing the amount of a voiced sound included in the low-frequency signal to between 0 and 1. For example, the voicing level calculating unit 110 may calculate the voicing level by using an open loop pitch lag correlation according to Equation 1:

$$\text{VoicingLevel}=1/(\text{OpenLoopPitchCorrelation}) \quad (1)$$

wherein ‘VoicingLevel’ denotes the voicing level calculated by the voicing level calculating unit 110 and ‘OpenLoopPitchCorrelation’ denotes the open loop pitch lag correlation received at IN2.

The noise-floor level updating unit 120 updates the noise-floor level of the high-frequency signal calculated by the noise-floor level calculating unit 100, according to the voicing level of the low-frequency signal calculated by the voicing level calculating unit 110. More specifically, when the voicing level calculating unit 110 represents that the degree to which the low-frequency signal contains a voiced sound is high, the noise-floor level updating unit 120 decreases the noise-floor level of the high-frequency signal calculated by the noise-floor level calculating unit 100. On the other hand, when the voicing level of the low-frequency signal calculated by the voicing level calculating unit 110 represents that the degree to which the low-frequency signal contains an voiced sound is low, the noise-floor level updating unit 120 does not adjust the noise-floor level of the high-frequency signal calculated by the noise-floor level calculating unit 100. For example, the noise-floor level updating unit 120 may update the noise-floor level of the high-frequency signal calculated by the noise-floor level calculating unit 100 according to the voicing level of the low-frequency signal calculated by the voicing level calculating unit 110, by using Equation 2:

$$\text{NewNoiseFloorLevel}=\text{NoiseFloorLevel}*(1-\text{VoicingLevel}/2) \quad (2)$$

wherein ‘NewNoiseFloorLevel’ denotes the noise-floor level updated by the noise-floor level updating unit 120, ‘NoiseFloorLevel’ denotes the noise-floor level calculated by the noise-floor level calculating unit 100, and ‘VoicingLevel’ denotes the normalized degree to which a low-frequency signal contains a voiced sound, where the normalized degree is calculated by the voicing level calculating unit 110.

When a high frequency signal of the speech signal is decoded according to existing Spectral Band Replication (SBR) technology, an excessive amount of noise is applied to the high-frequency signal, and thus noise is generated in a voiced sound section of the speech signal. In other words, the speech signal is very tonal when the voiced sound section of the speech signal is a low frequency signal, or tends to noise when the voiced sound section of the speech signal is a high frequency signal, because of the characteristics of the speech signal. Thus, in existing SBR technology, a great amount of noise is applied to a high frequency signal. However, according to the embodiment illustrated in FIG. 1, the noise-floor level updating unit 120 updates the noise-floor level calculated by the noise-floor level calculating unit 100, and thus noise in the voiced sound section of a speech signal is reduced.

The noise-floor level encoding unit 130 encodes the noise-floor level updated by the noise-floor level updating unit 120 as side data that can be conveyed to a decoder to reconstruct the high frequency band data of the audio signal.

The envelope extraction unit 140 generates one or more parameters which can used to reconstruct the envelope of the high frequency signal. For example, the envelope extraction unit 140 may calculate energy values of the respective sub-bands of the high frequency signal to establish a series of line segments corresponding to the shape of the spectral envelope.

The energy values may be encoded as side data to reconstruct the high frequency band of the audio signal at the decoder.

Figure 2:
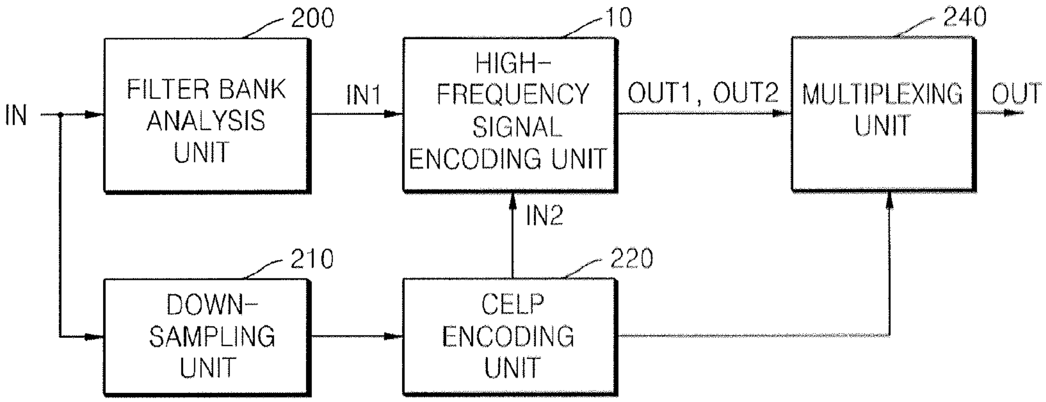
FIG. 2 is a block diagram of an apparatus to encode an audio signal, to which the high frequency signal encoding apparatus illustrated in FIG. 1 is applied, according to an embodiment of the present general inventive concept.

FIG. 2 is a block diagram of an apparatus to encode an audio signal, to which the high frequency signal encoding apparatus 10 illustrated in FIG. 1 is incorporated, according to an embodiment of the present general inventive concept. Referring to FIG. 2, the exemplary encoding apparatus 290 includes a filter bank analysis unit 200, a down-sampling unit 210, a CELP (Coded-Excited Linear Prediction) encoding unit 220, a high-frequency signal encoding unit 10, and a multiplexing unit 240.

The filter bank analysis unit 200 performs filter bank analysis to transform an audio signal (such as a speech signal or a music signal) received at an input port IN into a representation thereof in both the time domain and the frequency domain. The filter bank analysis unit 200 may be implemented by, for example, a Quadrature Mirror Filterbank (QMF) to divide the signal into a plurality of sub-band spectra as a function of time. Alternatively, the filter bank analysis unit 200 may transform the received audio signal so that the audio signal can be represented in only the frequency domain such as by using a filter bank that performs a transformation, such as fast Fourier transformation (FFT) or modified discrete cosine transformation (MDCT). It is to be understood that although only a single connection is illustrated at IN1, a connection corresponding to each sub-band may be established from the filter bank analysis unit 200 to the high-frequency signal encoding unit 10.

The down-sampling unit 210 down-samples the audio signal received at the input port IN at a predetermined sampling rate. The predetermined sampling rate may be a sampling rate suitable to encode according to coded-excited linear prediction (CELP). The down-sampling unit 210 may down-sample only the low frequency signal by sampling at a sampling rate corresponding to frequencies that are less than a predetermined frequency.

The CELP encoding unit 220 encodes the low frequency signal down-sampled by the down-sampling unit 210, according to the CELP technique. In the CELP technique, the characteristics of an input sound are characterized and removed from a signal, and an error signal remaining after the removal is encoded using a codebook. The CELP encoding unit 220 may output a data frame containing various parameters including, but not limited to, Linear Predictive Coefficients (LPCs) or the Line Spectral Pairs (LSPs) corresponding thereto, a pitch prediction gain, a pitch delay corresponding to a pitch lag correlation value, a codebook index, and a codebook gain. It is to be understood that the present general inventive concept is not limited to the CELP technique and other encoding methods of encoding an audio signal may be used without departing from the spirit and intended scope of the present general inventive concept.

The high-frequency signal encoding unit 230 encodes a high frequency signal of the audio signal obtained by the transformation performed in the filter bank analysis unit 200, the high frequency signal being contained in a band of frequencies that is greater than the predetermined frequency, by using the low frequency signal according to the SBR technique. The high-frequency signal encoding unit 230 may encode the noise-floor level of the high frequency signal so as to be added to the high-frequency signal restored from the low frequency signal. Accordingly, the high-frequency spectral data obtained by the transformation by the filter bank analysis unit 200 of FIG. 2 is input to the input port IN1, and a parameter, such as a pitch lag correlation or a pitch prediction gain, generated by the CELP encoding unit 220, is input to the input port IN2. The noise-floor level as updated according to the voicing level is output via the output port OUT1, and the data to recover the envelope of the high frequency signal is output via the output port OUT2.

The multiplexing unit 240 multiplexes the noise-floor level, the data to recover the envelope of the high frequency signal, and low-frequency data encoded by the CELP encoding unit 220 into a bitstream, and outputs the bitstream at an output port OUT.

Figure 3:
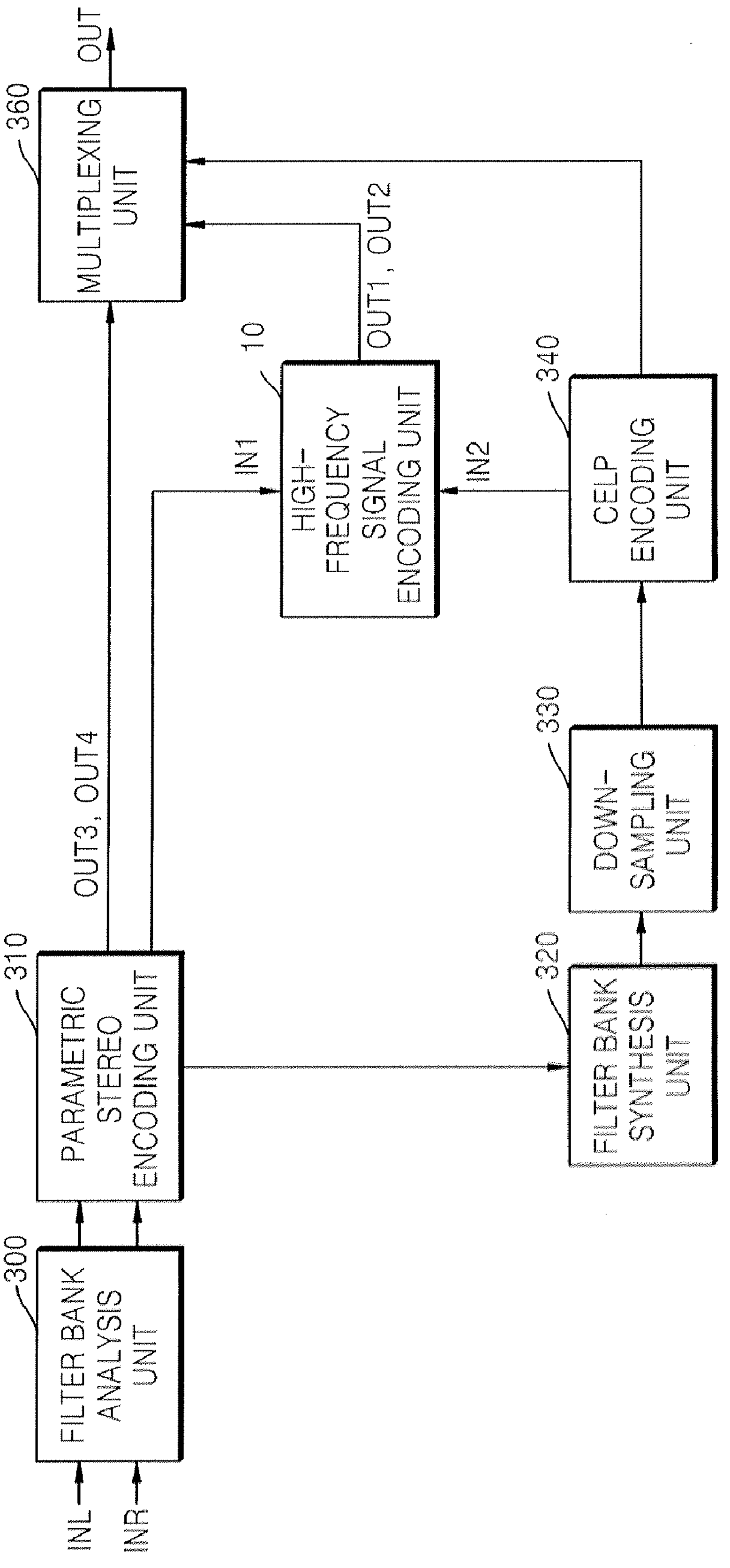
FIG. 3 is a block diagram of an apparatus to encode an audio signal using the high frequency signal encoding apparatus illustrated in FIG. 1 according to another embodiment of the present general inventive concept.

FIG. 3 is a block diagram of an apparatus to encode an audio signal using the high frequency signal encoding apparatus 10 illustrated in FIG. 1, according to another embodiment of the present general inventive concept. Referring to FIG. 3, the apparatus to encode an audio signal includes a filter bank analysis unit 300, a parametric stereo encoding unit 310, a filter bank synthesis unit 320, a down-sampling unit 330, a CELP encoding unit 340, the high-frequency signal encoding unit 10, and a multiplexing unit 360.

The filter bank analysis unit 300 performs filter bank analysis to transform a stereo audio signal (such as a speech signal or a music signal) received via an input ports INL and INR so that the audio signal can be represented in both the time domain and the frequency domain. The filter bank analysis unit 300 may use a filter bank such as a Quadrature Mirror Filterbank (QMF). Alternatively, the filter bank analysis unit 300 may transform the received stereo audio signal so that the stereo audio signal can be represented in only the frequency domain such as by a filter bank that performs transformation such as FFT or MDCT.

The parametric stereo encoding unit 310 extracts stereo channel parameters from the stereo spectral data generated by the filter bank analysis unit 300 with which a decoder can upmix a mono signal into a stereo signal, encodes the parameters, and downmixes the stereo signal spectra into mono signal spectra. Examples of the stereo channel parameters include, but are not limited to, a channel level difference (CLD) and an inter channel correlation (ICC).

The filter bank synthesis unit 320 inversely transforms the mono spectral data generated by the parametric stereo encoding unit 310 into the time domain. The filter bank synthesis unit 320 may be implemented using a filter bank (such as, a QMF) to inversely transform the signal represented in both the frequency domain and the time domain into a signal in only the time domain. Alternatively, the filter bank synthesis unit 320 may inversely transform a signal represented in only the frequency domain into a signal in the time domain by using a filter bank which performs inverse transformation such as inverse fast Fourier transformation (IFFT) or inverse modified discrete cosine transformation (IMDCT).

The down-sampling unit 330 down-samples the mono audio signal generated by the filter bank synthesis unit 320 according to a predetermined sampling rate. The predetermined sampling rate may be a sampling rate suitable for CELP encoding. The down-sampling unit 330 may down-sample only the low frequency signal by sampling at a rate corresponding to only signals having frequencies that are less than a predetermined frequency.

The CELP encoding unit 340 encodes the low frequency signal produced by the down-sampling unit 330 according to the CELP technique, as described above with reference to FIG. 2. However, as stated above, other methods to encode an audio signal in the time domain may be used with the present general inventive concept without deviating from the spirit and intended scope thereof.

The high-frequency signal encoding unit 10 encodes high frequency signal reconstruction data from the mono audio signal generated by the parametric stereo encoding unit 310, where the high frequency signal is contained in a band of frequencies that is greater than the predetermined frequency. In other words, the high-frequency signal encoding unit 350 encodes the noise-floor level of the high frequency signal, which is the amount of noise to be added to a signal obtained by replicating a low frequency signal restored by a decoder into the band of frequencies greater than the predetermined frequency, or by folding the low frequency signal into the high frequency band at the predetermined frequency. Accordingly, the spectra obtained by the parametric stereo encoding unit 310 of FIG. 3 is input to the input port IN1, and a parameter, such as a pitch lag correlation or a pitch prediction gain generated by the CELP encoding unit 340 of FIG. 3 is input to the input port IN2. The noise-floor level updated and encoded using the voicing level is output via the output port OUT1, and the spectral envelope data to reconstruct the envelope of the high frequency signal is output via the output port OUT2.

The multiplexing unit 360 multiplexes the parameters and mono spectral data encoded by the parametric stereo encoding unit 310, the noise-floor level updated and encoded by the high-frequency signal encoding unit 350, the parameter representing the envelope of the high frequency signal output by the high-frequency signal encoding unit 350, and a result of the encoding performed by the CELP encoding unit 340 into a bitstream that is output at an output port OUT.

Figure 4:
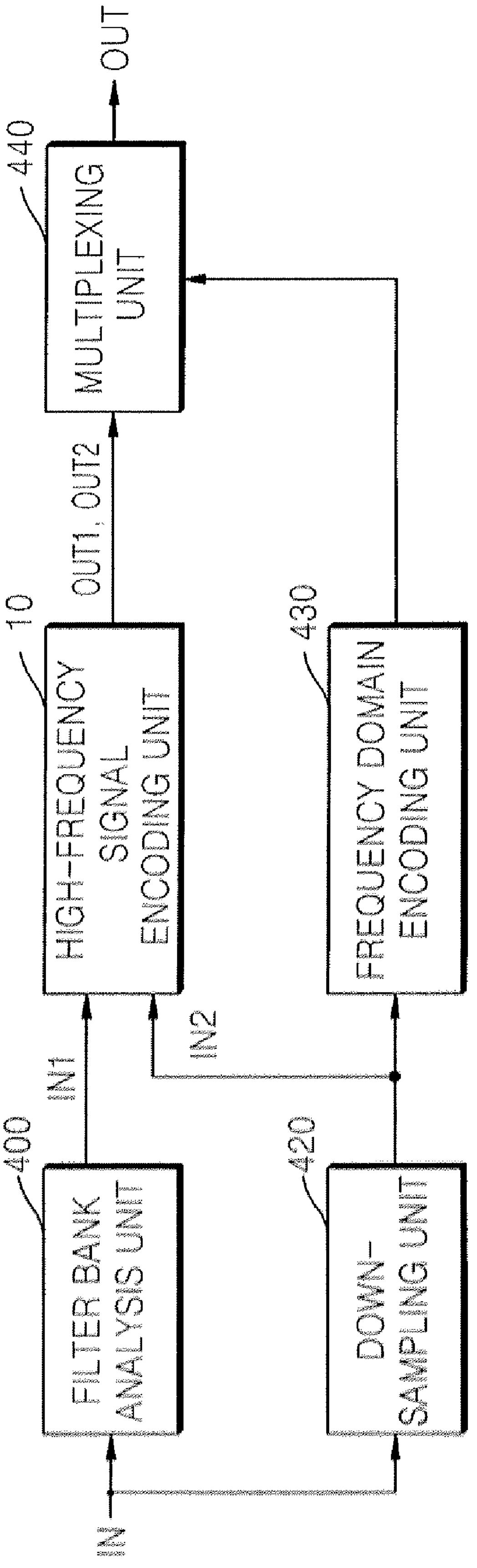
FIG. 4 is a block diagram of an apparatus to encode an audio signal using the high frequency signal encoding apparatus illustrated in FIG. 1 according to another embodiment of the present general inventive concept.

FIG. 4 is a block diagram of an apparatus to encode an audio signal by using the high frequency signal encoding apparatus 10 illustrated in FIG. 1, according to another embodiment of the present general inventive concept. Referring to FIG. 4, the apparatus to encode an audio signal includes a filter bank analysis unit 400, the high-frequency signal encoding unit 10, a down-sampling unit 420, a frequency domain encoding unit 430, and a multiplexing unit 440.

The filter bank analysis unit 400 performs filter bank analysis to transform an audio signal (such as a speech signal or a music signal) received at input port IN into both the time domain and the frequency domain. The filter bank analysis unit 400 may use a filter bank such as a Quadrature Mirror Filterbank (QMF). Alternatively, the filter bank analysis unit 400 may transform the received audio signal to be represented in only the frequency domain using a filter bank that performs a transformation such as FFT or MDCT.

The high-frequency signal encoding unit 10 encodes a high frequency signal of the audio signal obtained by the transformation performed in the filter bank analysis unit 400, the high frequency signal being contained in a band of frequencies that is greater than a predetermined frequency by using a low frequency signal corresponding to a band of frequencies that is less than the predetermined frequency. The high-frequency signal encoding unit 10 encodes as side data the noise-floor level of the high frequency signal, which is the amount of noise to be added to a signal obtained by replicating a low frequency signal restored by a decoder into the band of frequencies greater than the predetermined frequency, or by folding the low frequency signal into the high frequency band at the predetermined frequency. The spectral band data obtained by the transformation performed in the filter bank analysis unit 400 of FIG. 4 is input to the input port IN1. Accordingly, the noise-floor level updated and encoded using the voicing level is output via the output port OUT1, and the parameter to reconstruct the envelope of the high frequency signal is output via the output port OUT2.

The down-sampling unit 420 down-samples the audio signal received at the input port IN at a predetermined sampling rate corresponding to frequencies less than a predetermined frequency. The down-sampling unit 420 may down-sample only the low frequency signal by sampling at a frequency corresponding to only signals having frequencies that are less than the predetermined frequency. The down-sampled data may be provided to the high-frequency signal encoder 10 so that the voicing level calculating unit 110 may perform pitch analysis, or other voicing level determination.

The frequency domain encoding unit 430 encodes the signal down-sampled by the down-sampling unit 420 in the frequency domain. For example, the frequency domain encoding unit 430 transforms the low frequency signal down-sampled by the down-sampling unit 420 from the time domain to the frequency domain, quantizes the low frequency signal in the frequency domain, and performs entropy encoding on the quantized low frequency signal.

The multiplexing unit 440 multiplexes the noise-floor level updated and encoded by the high-frequency signal encoding unit 410, the parameter to reconstruct the envelope of the high frequency signal output by the high-frequency signal encoding unit 410, and a result of the encoding performed by the frequency domain encoding unit 430 to generate a bitstream, and outputs the bitstream via an output port OUT.

Figure 5:
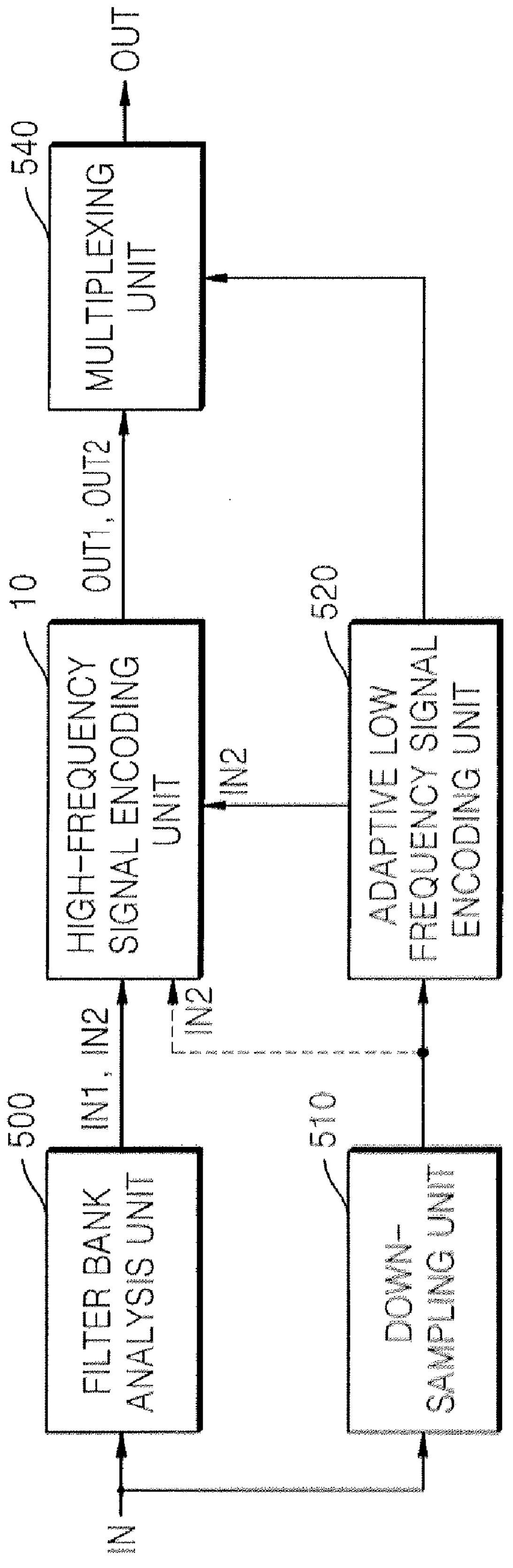
FIG. 5 is a block diagram of an apparatus to encode an audio signal using the high frequency signal encoding apparatus illustrated in FIG. 1 according to another embodiment of the present general inventive concept.

FIG. 5 is a block diagram of an apparatus to encode an audio signal by using the high frequency signal encoding 10 apparatus illustrated in FIG. 1, according to another embodiment of the present general inventive concept. Referring to FIG. 5, the apparatus to encode the audio signal includes a filter bank analysis unit 500, a down-sampling unit 510, an adaptive low-frequency signal encoding unit 520, the high-frequency signal encoding unit 10, and a multiplexing unit 540.

The filter bank analysis unit 500 performs filter bank analysis to transform an audio signal (such as a speech signal or a music signal) received at an input port IN into both the time domain and the frequency domain representations thereof. The filter bank analysis unit 500 may use a filter bank such as a QMF. Alternatively, the filter bank analysis unit 500 may transform the received audio signal into only the frequency domain representation thereof, such as by using a filter bank that performs FFT or MDCT.

The down-sampling unit 510 down-samples the audio signal received via the input port IN at a predetermined sampling rate corresponding to the low-frequency signals having frequencies that are less than a predetermined frequency, and may be sampled at a rate suitable to be CELP encoded.

The adaptive low-frequency signal encoding unit 520 encodes the low frequency signal down-sampled by the down-sampling unit 510, according to one of a plurality of encoding processes. For example, the adaptive low-frequency signal encoding unit 52 may perform one of CELP encoding and entropy encoding according to a predetermined criterion, where the CELP encoding and the entropy encoding is discussed above.

The adaptive low-frequency signal encoding unit 520 may encode as side data information indicating which of the CELP encoding the frequency domain coding was used to encode each of the sub-bands of the low-frequency signal down-sampled by the down-sampling unit 510.

The high-frequency signal encoding unit 10 encodes a high frequency signal of the audio signal obtained by the transformation performed in the filter bank analysis unit 500, the high frequency signal being included in a band of frequencies that is greater than the predetermined frequency. As described with reference to FIG. 1, the signal obtained by the transformation performed by the filter bank analysis unit 500 of FIG. 5 is input to the input port IN1, and the low-frequency signal down-sampled by the down-sampling unit 510 of FIG. 5, or a parameter such as a pitch lag correlation or a pitch prediction gain generated by the encoding performed by the adaptive low-frequency signal encoding unit 520 of FIG. 5, is input to the input port IN2. In addition, the noise-floor level updated and encoded using the voicing level is output via the output port OUT1, and the parameter to reconstruct the envelope of the high frequency signal is output via the output port OUT2.

In certain embodiments of the present general inventive concept, if the adaptive low-frequency signal encoding unit 520 encodes the low frequency signal by using the CELP encoding method, the high-frequency signal encoding unit 530 updates, in the noise-floor level updating unit 120, the noise-floor level calculated in the noise-floor level calculating unit 100. On the other hand, if the adaptive low-frequency signal encoding unit 520 encodes the low frequency signal using the frequency domain encoding, the high-frequency signal encoding unit 10 may not update, in the noise-floor level updating unit 120, the noise-floor level calculated in the noise-floor level calculating unit 100. That is, the high-frequency signal encoding unit 10 encodes, in the noise-floor level encoding unit 130, the noise-floor level calculated in the noise-floor level calculating unit 100 without performing updating when the frequency domain encoding is used.

The multiplexing unit 540 multiplexes the noise-floor level updated and encoded by the high-frequency signal encoding unit 10, the parameter to reconstruct the envelope of the high frequency signal output by the high-frequency signal encoding unit 530, a result of the encoding performed by the adaptive low-frequency signal encoding unit 520, and the information indicating which of the CELP encoding method and the method of performing encoding in the frequency domain was used to encode each of the sub-bands of the low-frequency signal, thereby generating a bitstream. The bitstream is output via an output port OUT.

Exemplary decoding apparatuses according to embodiments of the present general inventive concept will now be described.

Figure 6:
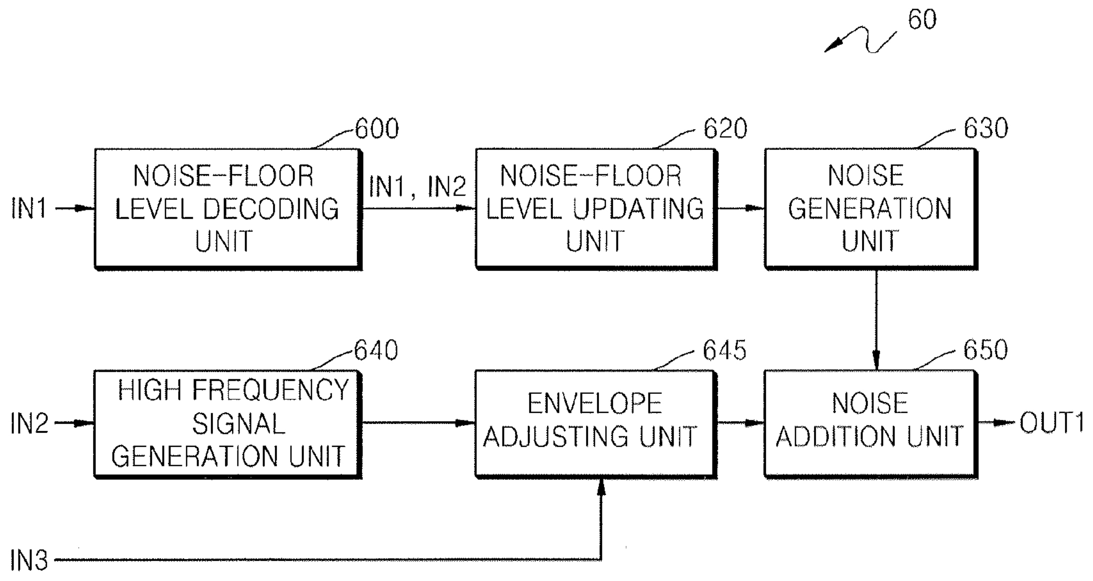
FIG. 6 is a block diagram of a high frequency signal decoding apparatus according to an embodiment of the present general inventive concept.

FIG. 6 is a block diagram of a high frequency signal decoding apparatus 60 according to an embodiment of the present general inventive concept. Referring to FIG. 6, the high frequency signal decoding apparatus includes a noise-floor level decoding unit 600, a noise generation unit 630, a high frequency signal generation unit 640, an envelope adjusting unit 645, and a noise addition unit 650.

The noise-floor level decoding unit 600 decodes a noise-floor level of a high frequency signal corresponding to a band of frequencies that is greater than a predetermined frequency provided at the input IN1.

The noise generation unit 630 generates a random noise signal according to a predetermined manner and controls the random noise signal according to the noise-floor level decoded by the noise-floor level decoding unit 600.

The high-frequency signal generation unit 640 generates a high frequency signal using the low frequency spectral data obtained by the decoding performed in a decoder. For example, the high-frequency signal generation unit 640 generates high frequency band spectral data by replicating the low frequency spectral data in a high frequency band of frequencies greater than the predetermined frequency according to the SBR technique, or by folding the low frequency spectral data into the high-frequency band at the predetermined frequency.

The envelope adjusting unit 645 adjusts the envelope of the generated high-frequency signal by decoding the parameter or parameters regarding the spectral envelope of the high frequency signal and modulating the generated high-frequency signal accordingly.

The noise addition unit 650 adds the voicing level adjusted random noise signal generated by the noise generation unit 630 to the high frequency signal whose envelope has been adjusted by the envelope adjusting unit 645.

Figure 7:
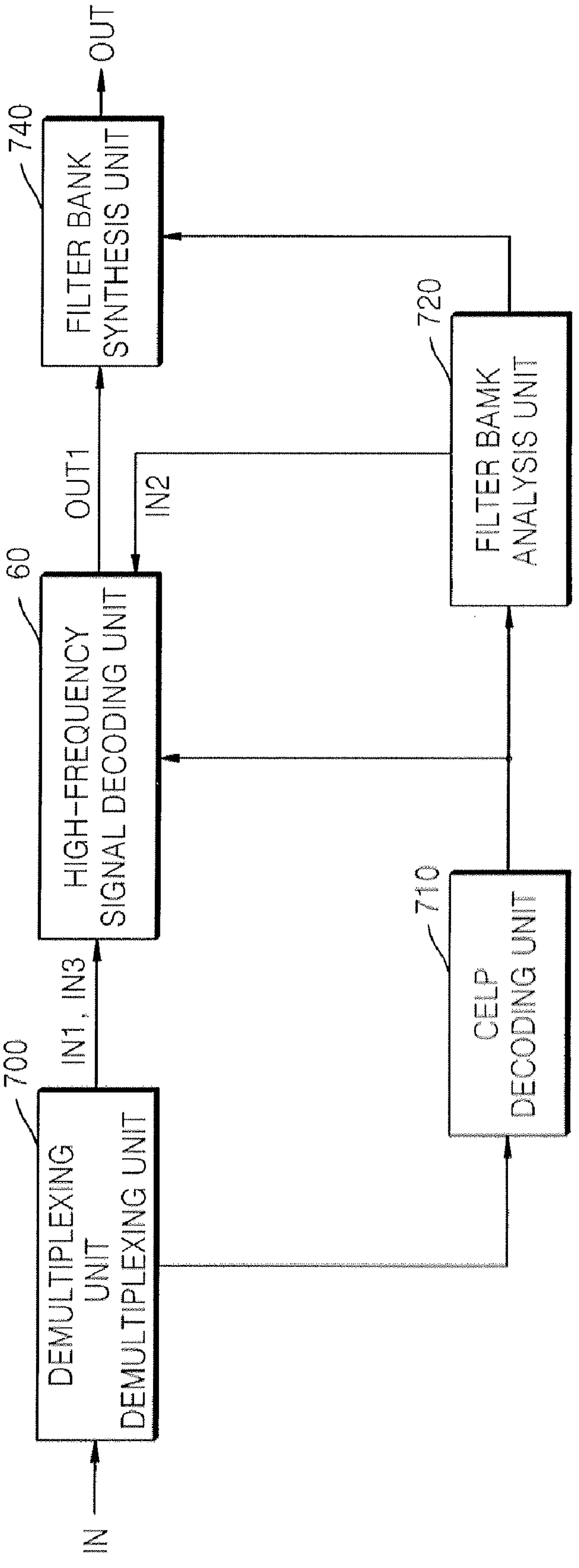
FIG. 7 is a block diagram of an apparatus to decode an audio signal using the high frequency signal decoding apparatus illustrated in FIG. 6 according to an embodiment of the present general inventive concept.

FIG. 7 is a block diagram of an apparatus to decode an audio signal using the high frequency signal decoding apparatus 60 illustrated in FIG. 6, according to an embodiment of the present general inventive concept. Referring to FIG. 7, the apparatus to decode an audio signal includes a demultiplexing unit 700, a CELP decoding unit 710, a filter bank analysis unit 720, the high-frequency signal decoding unit 60, and a filter bank synthesis unit 740.

The demultiplexing unit 700 receives a bitstream from an encoding end via an input port IN and demultiplexes the bitstream. The bitstream to be demultiplexed by the demultiplexing unit 700 may include a result obtained by encoding a low frequency signal contained in a band of frequencies less than a predetermined frequency according to the CELP technique, and side data including, for example, the noise-floor level of a high frequency signal pertaining to a band of frequencies greater than the predetermined frequency, a parameter that represents the envelope of the high frequency signal, and other parameters to use in decoding the high frequency signal by using the low frequency signal.

The CELP decoding unit 710 restores a low frequency signal by decoding the CELP-encoded signal, which is demultiplexed in the demultiplexing unit 700, according to the CELP technique. However, decoding techniques other than the CELP technique may be used with the present general inventive concept to decode an audio signal in the time domain.

The filter bank analysis unit 720 performs filter bank analysis in order to transform the low frequency signal restored by the CELP decoding unit 710 into the time and frequency domain representation. The filter bank analysis unit 720 may use a filter bank such as a QMF. Alternatively, the filter bank analysis unit 720 may transform the restored low-frequency signal so that the low frequency signal is represented in only the frequency domain. For example, the filter bank analysis unit 720 may transform the restored low-frequency signal into the frequency domain using a filter bank that performs transformation such as FFT or MDCT.

The high-frequency signal decoding unit 60 restores a high frequency signal by using the low frequency signal obtained by the transformation performed in the filter bank analysis unit 720 and the noise-floor level demultiplexed in the demultiplexing unit 700, using, for example, the SBR technique. Using the high-frequency signal decoding apparatus 60 illustrated in FIG. 6, the noise-floor level of the high frequency signal obtained by the demultiplexing performed by the demultiplexing unit 700 of FIG. 7 is input to the input port IN1. The low frequency spectral data obtained by the transformation performed in the filter bank analysis unit 720 is input to the input port IN2. The parameter or parameters to recover the envelope of the high frequency signal obtained from the demultiplexing unit 700 is input to the input port IN3. The high frequency signal restored according to the noise-floor level updated using the voicing level is output via the output port OUT1.

The filter bank synthesis unit 740 performs an inverse transformation from the frequency domain to the time domain, such as by performing filterbank synthesis corresponding to a transformation inverse to the transformation performed by the filter bank analysis unit 720. The filter bank synthesis unit 740 outputs a restored time-series audio signal via an output port OUT. The filter bank synthesis unit 740 may be implemented using a filter bank (such as, a QMF) to inversely transform a signal represented in both the frequency domain and the time domain into a signal in only the time domain. Alternatively, the filter bank synthesis unit 740 may inversely transform a signal represented in only the frequency domain into a signal in the time domain by using a filter bank which performs inverse transformation such as IFFT or IMDCT.

Figure 8:
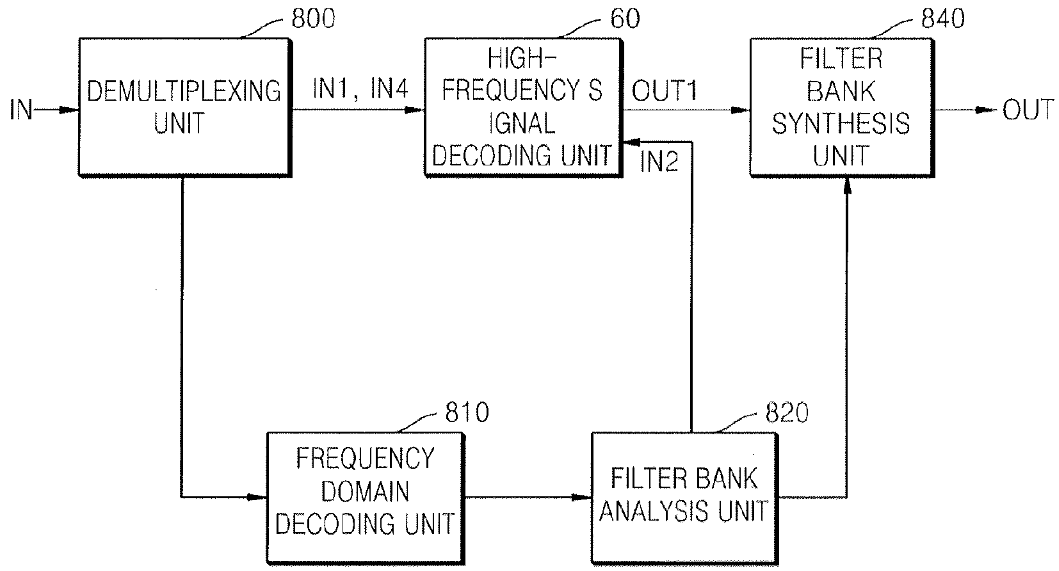
FIG. 8 is a block diagram of an apparatus to decode an audio signal using the high frequency signal decoding apparatus illustrated in FIG. 6 according to another embodiment of the present general inventive concept.

FIG. 8 is a block diagram of an apparatus to decode an audio signal using the high frequency signal decoding apparatus 60 illustrated in FIG. 6, according to another embodiment of the present general inventive concept. Referring to FIG. 8, the apparatus decode an audio signal includes a demultiplexing unit 800, the frequency domain decoding unit 810, a filter bank analysis unit 820, the high-frequency signal decoding unit 60, and a filter bank synthesis unit 840.

The demultiplexing unit 800 receives a bitstream from an encoding end via an input port IN and demultiplexes the bitstream. The bitstream demultiplexed by the demultiplexing unit 700 may include an encoded low frequency signal in a band of frequencies less than a predetermined frequency, the noise-floor level of a high frequency signal in a band of frequencies greater than the predetermined frequency, a parameter or parameters to reconstruct the envelope of the high frequency signal, and other parameters to use in decoding the high frequency signal from the low frequency signal.

The frequency domain decoding unit 810 restores a low frequency signal by decoding the low frequency signal obtained from the demultiplexing unit 800. For example, the frequency domain decoding unit 810 may restore a low frequency signal by entropy-decoding and inversely-quantizing a low frequency signal encoded by an encoder and inversely transforming the low frequency signal from the frequency domain to the time domain.

The filter bank analysis unit 820 performs filter bank analysis in order to transform the low frequency signal restored by the frequency domain decoding unit 810 into both the time domain and the frequency domain. The filter bank analysis unit 820 may use a filter bank such as a QMF. Alternatively, the filter bank analysis unit 820 may transform the restored low-frequency signal so that the low frequency signal can be represented in only the frequency domain such as by an FFT or MDCT.

The high-frequency signal decoding unit 60 restores a high frequency signal by replicating the low frequency signal obtained by the transformation performed in the filter bank analysis unit 820 according to, for example, the SBR technique. The high-frequency signal decoding unit 60 also adds noise according to the noise-floor level updated according to the voicing level at the encoder. The noise-floor level of the high frequency signal obtained from the demultiplexing unit 800 and/or other parameters to use in decoding the high frequency signal using the low frequency signal is input to the input port IN1. The low frequency signal obtained from the frequency domain decoding unit 810 is input to the input port IN2. The parameter or parameters to reconstruct the envelope of the high frequency signal, as obtained from the demultiplexing unit 800, is input to the input port IN3. The high frequency signal restored using the SBR technique according to the noise-floor level updated on the basis of the voicing level is output via the output port OUT1.

The filter bank synthesis unit 840 synthesizes the low frequency signal obtained by the frequency domain decoding unit 810 with the high frequency signal restored by the high-frequency signal decoding unit 60 by inverse transformation from the frequency domain to the time domain. The filter bank synthesis unit 840 outputs a restored time-series audio signal via an output port OUT. The filter bank synthesis unit 840 may be implemented using a filter bank (such as, a QMF) to inversely transform a signal represented in both the frequency domain and the time domain into a signal in only the time domain. Alternatively, the filter bank synthesis unit 840 may inversely transform a signal represented in only the frequency domain into a signal in the time domain by performing an inverse transformation such as IFFT or IMDCT.

Figure 9:
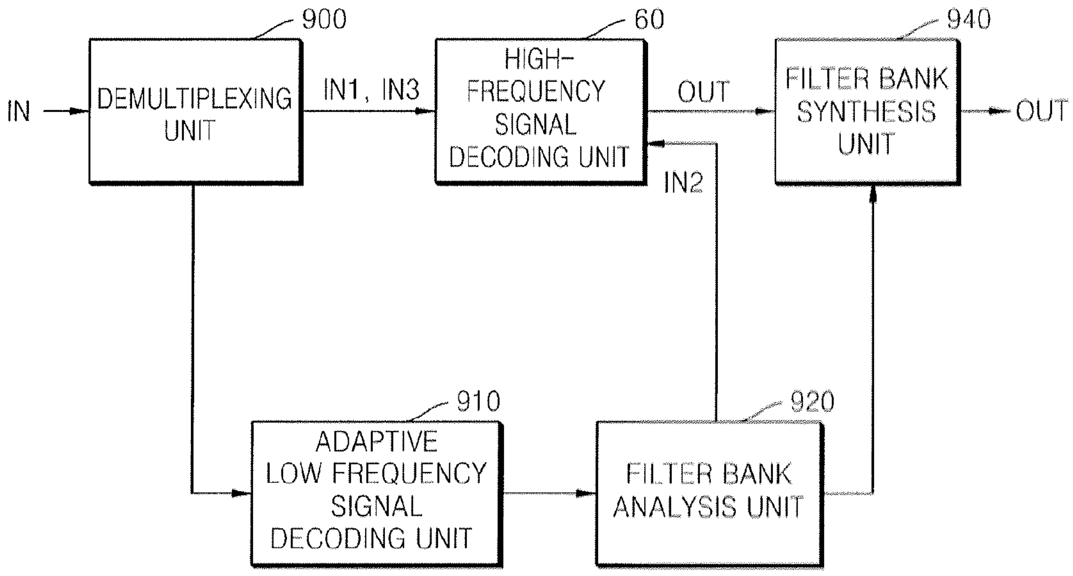
FIG. 9 is a block diagram of an apparatus to decode an audio signal using the high frequency signal decoding apparatus illustrated in FIG. 6 according to another embodiment of the present general inventive concept.

FIG. 9 is a block diagram of an apparatus to decode an audio signal using the high frequency signal decoding apparatus 60 illustrated in FIG. 6, according to another embodiment of the present general inventive concept. Referring to FIG. 9, the apparatus to decode an audio signal includes a demultiplexing unit 900, an adaptive low frequency signal decoding unit 910, a filter bank analysis unit 920, the high-frequency signal decoding unit 60, and a filter bank synthesis unit 940.

The demultiplexing unit 900 receives a bitstream from an encoding end via an input port IN and demultiplexes the bitstream to obtain a low frequency signal in a band of frequencies less than a predetermined frequency, and side data such as the noise-floor level of a high frequency signal pertaining to a band of frequencies greater than the predetermined frequency, at least one parameter to reconstruct the envelope of the high frequency signal, other parameters to use in decoding the high frequency signal using the low frequency signal, and information representing which of the CELP encoding method and the frequency domain encoding method was used to encode each of the sub-bands of the low-frequency signal.

The adaptive low frequency signal decoding unit 910 restores a low frequency signal by decoding the encoded low frequency signal obtained from the demultiplexing unit 900. At the encoder, one of the CELP encoding method and the frequency domain encoding method may have been used to encode each of the sub-bands of a low-frequency signal and an indication as to which of the two methods was used was incorporated into the bitstream, as discussed above with reference to FIG. 5. The adaptive low frequency signal decoding unit 910 receives the information representing which of the CELP encoding method and the frequency domain encoding method was used to encode each of the sub-bands of the low-frequency signal from the demultiplexing unit 900 and decodes the low-frequency signal accordingly.

The filter bank analysis unit 920 performs filter bank analysis in order to transform the low frequency signal restored by the adaptive low frequency signal decoding unit 910 into both the time domain and the frequency domain. The filter bank analysis unit 920 may use a filter bank such as a QMF. Alternatively, the filter bank analysis unit 920 may transform the restored low-frequency signal into only the frequency domain such as through an FFT or MDCT.

The high-frequency signal decoding unit 60 restores a high frequency signal as described with reference to FIG. 6. The noise-floor level of the high frequency signal obtained from the demultiplexing unit 900, and/or other to use in decoding the high frequency signal from the low frequency signal, is input to the input port IN1. The low frequency signal obtained by the transformation performed in the filter bank analysis unit 920 is input to the input port IN2. The parameter to reconstruct the envelope of the high frequency signal is input to the input port IN3. The high frequency signal restored using the SBR technique according to the noise-floor level updated on the basis of the voicing level is output via the output port OUT1.

The filter bank synthesis unit 940 performs inverse transformation from the frequency domain to the time domain corresponding to a transformation inverse to the transformation performed by the filter bank analysis unit 920. The filter bank synthesis unit 940 outputs a restored time-series audio signal via an output port OUT. The filter bank synthesis unit 940 may be implemented using a filter bank (such as, a QMF) to inversely transform a signal represented in both the frequency domain and the time domain into a signal in only the time domain. Alternatively, the filter bank synthesis unit 940 may inversely transform a signal represented in only the frequency domain into a signal in the time domain by using a filter bank to perform an inverse transformation such as IFFT or IMDCT.

Figure 10:
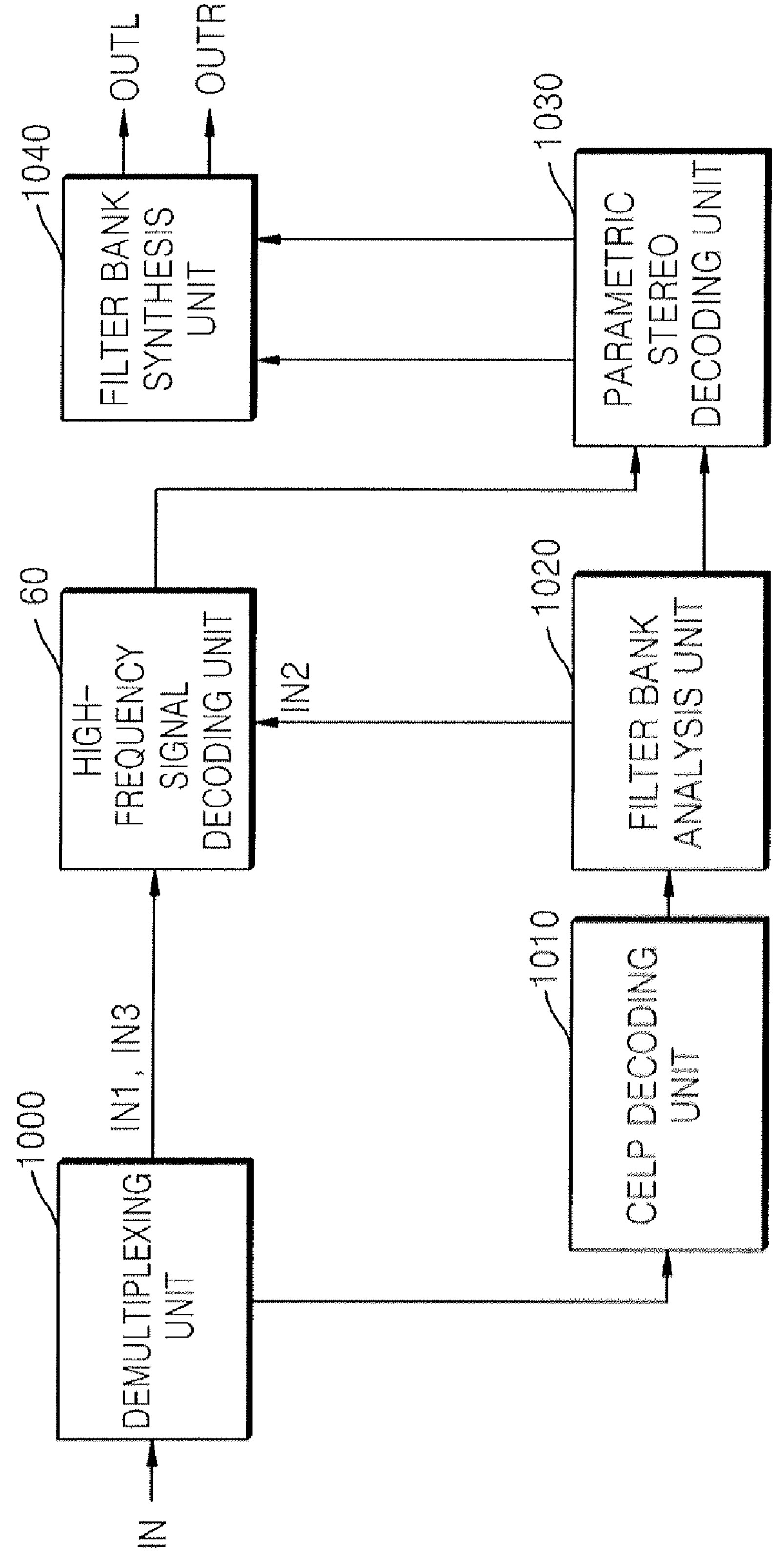
FIG. 10 is a block diagram of an apparatus to decode an audio signal by using the high frequency signal decoding apparatus illustrated in FIG. 6 according to another embodiment of the present general inventive concept.

FIG. 10 illustrates an exemplary decoder configuration according to an embodiment of the present general inventive concept. A bitstream from an encoder, such as illustrated in FIG. 3, is provided to a demultiplexing unit 1000 at an input port IN of the decoder. The demultiplexer 1000 demultiplexes the bitstream into its constituent components. The demultiplexer 1000 provides an encoded noise level and a parameter or parameters to reconstruct the spectral envelope of the high-frequency signal to ports IN1 and IN3, respectively, of the high-frequency signal decoding unit 60, CELP encoded low-frequency signal data to the CELP decoding unit 1010, and stereo channel parameters, as described with reference to FIG. 3, to the parametric stereo decoding unit 1030.

The filter bank analysis unit 1020 generates spectral data of the low-frequency signal decoded by the CELP decoding unit 1010. The low-frequency spectral data are provided to input port IN2 of the high-frequency signal decoding unit 60, which reconstructs the high-frequency spectral data as described in the exemplary embodiments above. The high frequency spectral data from the high-frequency signal decoding unit 60 and the low-frequency spectral data from the filter bank analysis unit 1030 are provided to the parametric stereo decoding unit 1030, which also receives the stereo channel parameters, such as the ICC or the CLD discussed with reference to FIG. 3, from the demultiplexing unit 1000. The parametric stereo decoding unit mixes the low frequency spectral data and the high frequency spectral data into a mono signal spectrum, and generates the stereo signal spectra therefrom in accordance with the stereo channel parameters. The parametric stereo decoding unit provides the stereo signal spectra to the filter bank synthesis unit 1040, which inverse transforms the stereo spectra into restored time-series stereo audio signals OUTL and OUTR.

Encoding methods according to embodiments of the present general inventive concept will now be described.

Figure 11:
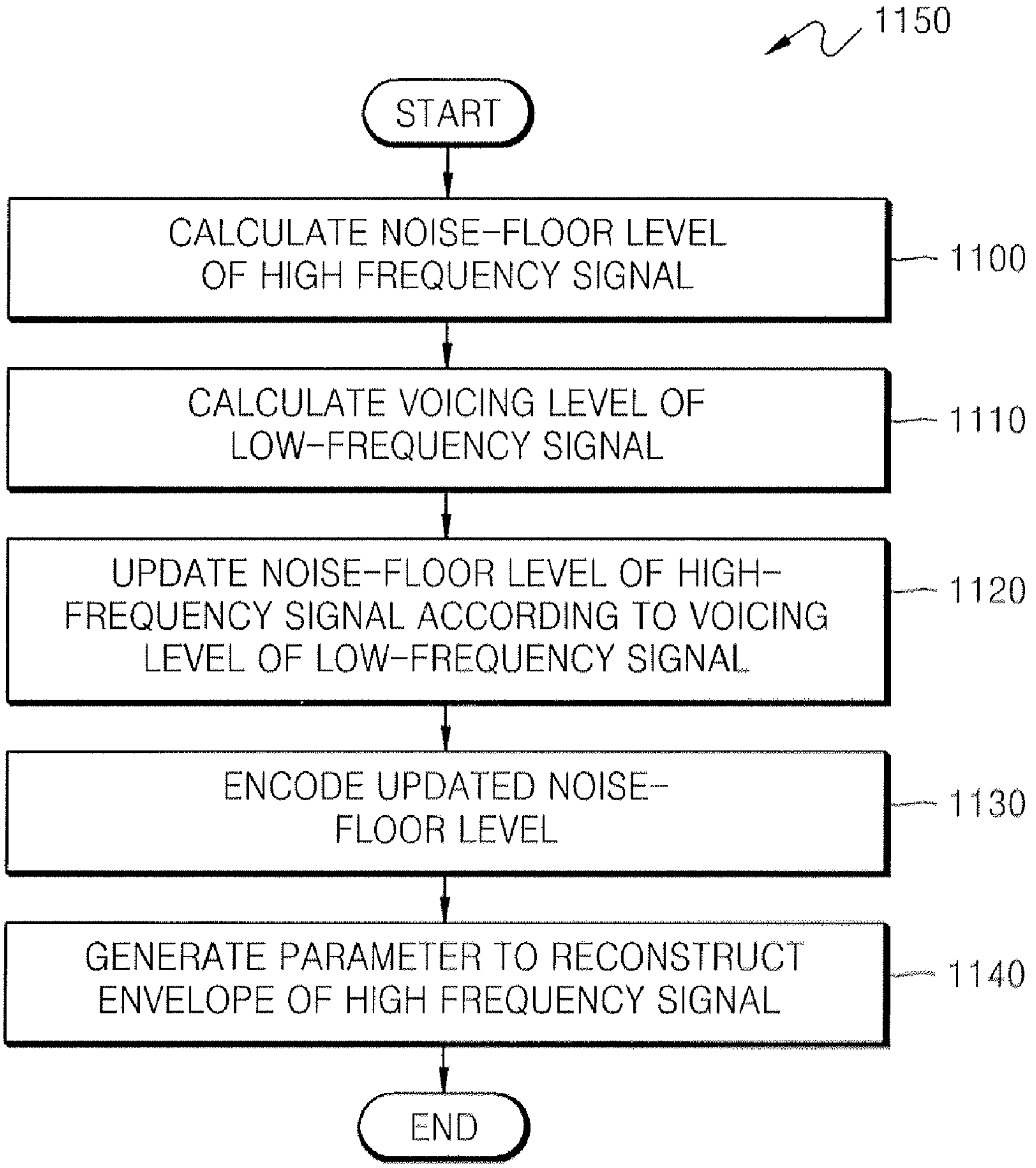
FIG. 11 is a flowchart of a high frequency signal encoding method according to an embodiment of the present general inventive concept.

FIG. 11 is a flowchart of an exemplary high frequency signal encoding process 1150 according to an embodiment of the present general inventive concept. First, in operation 1100, a noise-floor level of a high frequency signal in a band of frequencies that is greater than a predetermined frequency is calculated. The noise-floor level denotes the amount of noise that is to be added to a high frequency signal restored by a decoder.

In operation 1100, a difference between a spectral envelope defined by minimum points on a signal spectrum and a spectral envelope defined by maximum points on the signal spectrum may be calculated as the noise-floor level.

Alternatively, in operation 1100, the noise-floor level may be calculated by comparing the tonality of the high-frequency signal with the tonality of a low frequency signal in a band of frequencies that is less than the predetermined frequency, where the low frequency signal is used to encode the high-frequency signal. When the noise-floor level is calculated in this manner, the noise-floor level is calculated so that a greater tonality of the high-frequency signal than that of the low-frequency signal results in more noise being applied to the high-frequency signal at the decoder.

In operation 1110, a voicing level of the low-frequency signal is calculated. As stated above, the voicing level denotes the degree to which the low-frequency signal contains a voiced sound or unvoiced sound. Hereinafter, the embodiment illustrated in FIG. 11 will be described based on the assumption that the voicing level indicates a measure of content in the low-frequency signal of a voiced sound.

In operation 1110, the voicing level may be calculated using a pitch lag correlation or a pitch prediction gain. In operation 1110, the voicing level may be calculated by receiving, for example, the pitch lag correlation or the pitch prediction gain and normalizing the degree of similarity to a voiced sound to between 0 and 1. For example, in operation 1110, the voicing level may be calculated using an open loop pitch lag correlation according to Equation 1 above.

In operation 1120, the noise-floor level of the high-frequency signal calculated in operation 1100 is updated according to the voicing level of the low-frequency signal calculated in operation 1110. More specifically, in operation 1120, when the voicing level of the low-frequency signal calculated in operation 1110 represents that the degree to which the low frequency signal contains a voiced sound is high, the noise-floor level of the high-frequency signal calculated in operation 1100 is decreased. On the other hand, in operation 1120, when the voicing level of the low-frequency signal calculated in operation 1110 represents that the degree of the voiced sound is low, the noise-floor level of the high-frequency signal calculated in operation 1100 is not adjusted. For example, in operation 1120, the noise-floor level of the high-frequency signal calculated in operation 1100 is updated according to the voicing level of the low-frequency signal calculated in operation 1110, by using Equation 2 above.

In operation 1130, the noise-floor level updated in operation 1120 is encoded.

In operation 1140, a parameter or parameters representing the envelope of the high frequency signal is generated so that the high-frequency spectral envelope can be reconstructed at a decoder. As described above, in operation 1140, energy values of the respective sub-bands of the high frequency signal may be calculated and encoded as the side data to reform the shape of the high frequency spectral envelope at the decoder.

Figure 12:
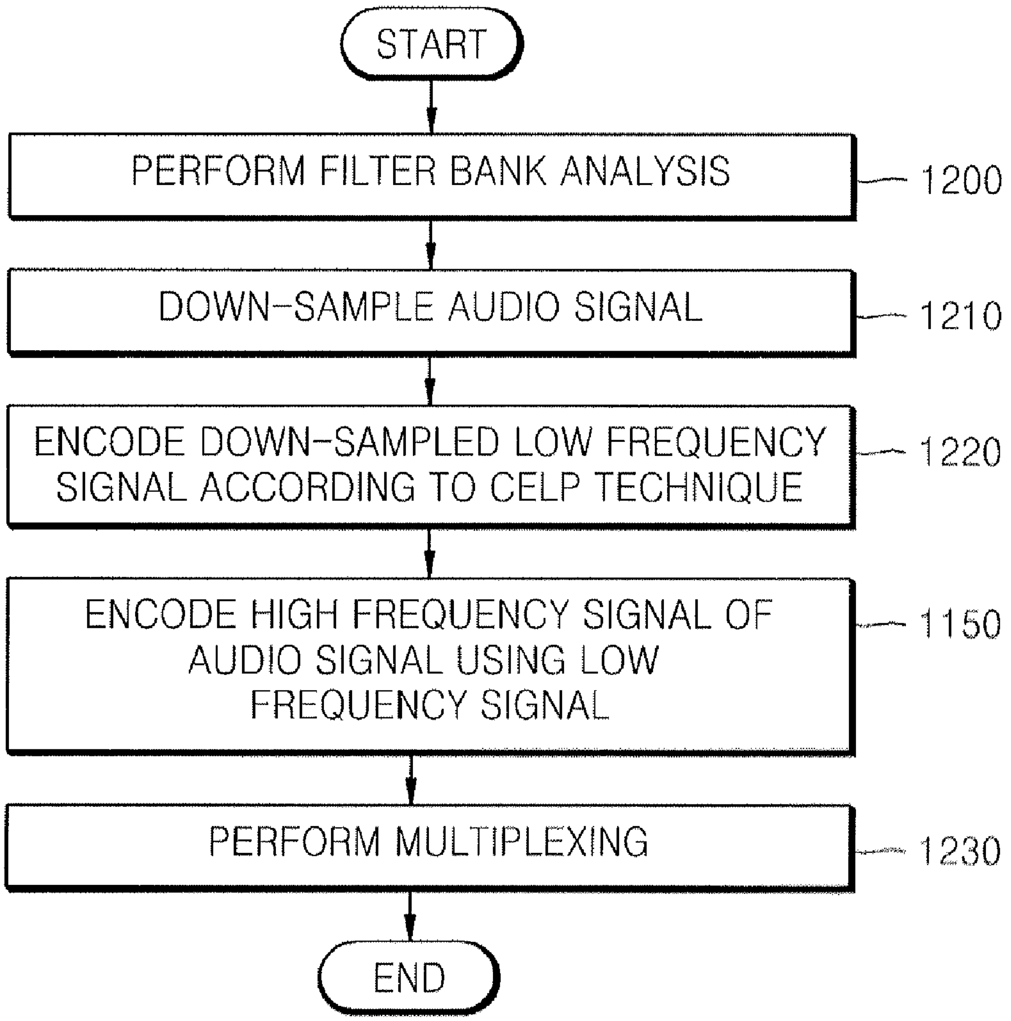
FIG. 12 is a flowchart of a method of encoding an audio signal using the high frequency signal decoding method illustrated in FIG. 11 according to an embodiment of the present general inventive concept.

FIG. 12 is a flowchart of an exemplary method of encoding an audio signal, to which the high frequency signal encoding process 1150 illustrated in FIG. 11 is applied, according to an embodiment of the present general inventive concept.

First, in operation 1200, filter bank analysis is performed in order to transform an audio signal (such as a speech signal or a music signal) into both the time domain and the frequency domain representations thereof. The operation 1200 may be implemented using a filter bank such as a QMF. Alternatively, in operation 1200, the received audio signal may be transformed into only the frequency domain such as by FFT or MDCT.

In operation 1210, the audio signal received via the input port IN is down-sampled at a predetermined sampling rate. The predetermined sampling rate may be a sampling rate suitable to encode the signal using the CELP technique. In operation 1210, the low frequency signal is sampled to lie in a band of frequencies that is less than a predetermined frequency.

In operation 1220, the low frequency signal down-sampled in operation 1210 is encoded according to the CELP technique as described above. It is to be understood that, in operation 1220, other methods may be used to encode an audio signal in the time domain.

A high frequency signal of the audio signal obtained by the transformation performed in operation 1200 is encoded using the low frequency signal according to, for example, the SBR technique is performed in operation 1150, as described above with reference to FIG. 11. The noise-floor level of the high frequency signal is calculated using the signal obtained by the transformation performed in operation 1200, the voicing level is calculated using the signal down-sampled in operation 1210 or by using a parameter (such as a pitch lag correlation or a pitch prediction gain) generated by the encoding performed in operation 1220. In operation 1150, the noise-floor level is updated and encoded using the voicing level as described above.

In operation 1230, the noise-floor level updated and encoded in operation 1150, the parameter that can represent the envelope of the high frequency signal, which is obtained in operation 1150, and a result of the encoding performed in operation 1220, are multiplexed to generate a bitstream.

Figure 13:
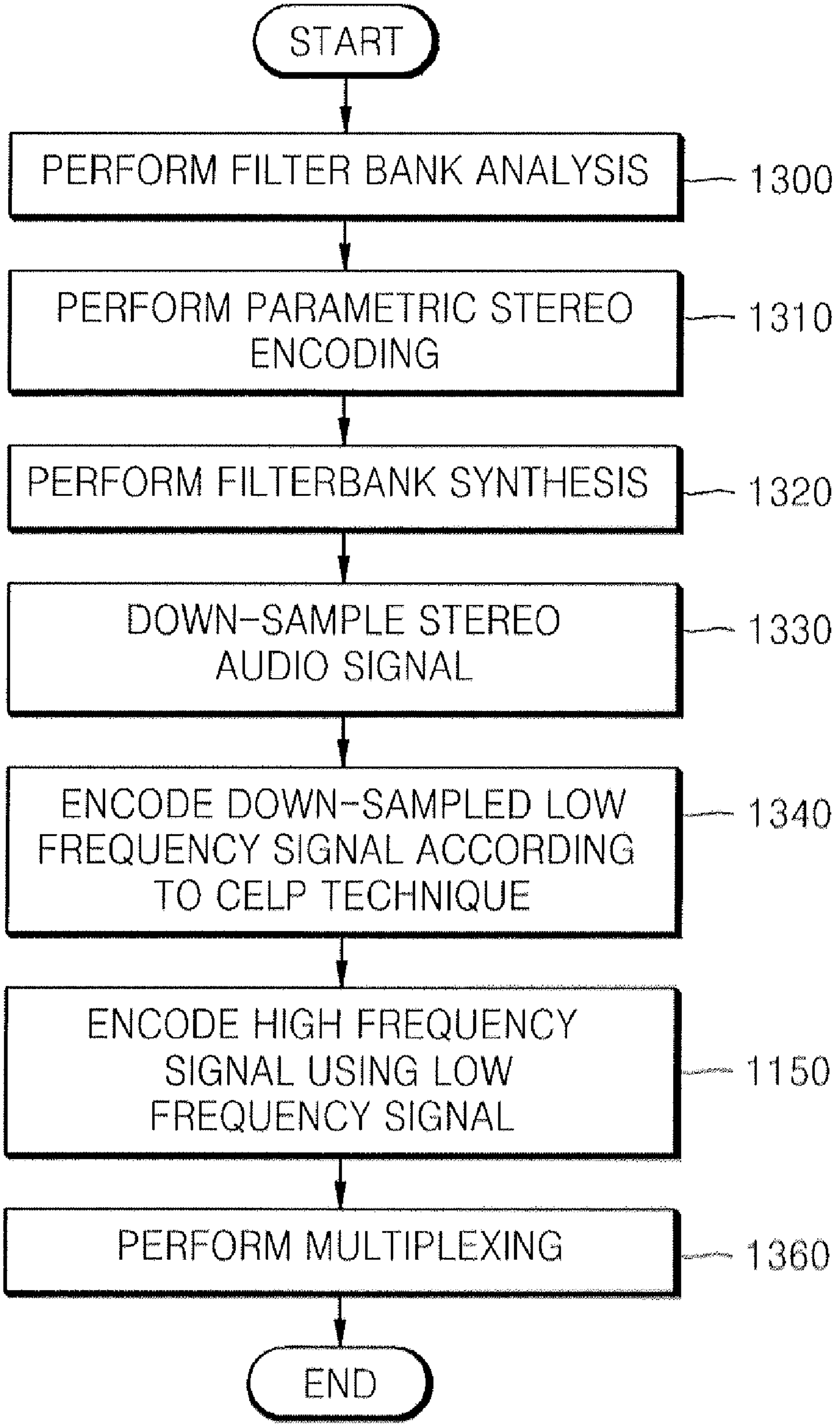
FIG. 13 is a flowchart of a method of encoding an audio signal using the high frequency signal encoding method illustrated in FIG. 11 according to another embodiment of the present general inventive concept.

FIG. 13 is a flowchart of an exemplary method of encoding an audio signal using the high frequency signal encoding apparatus illustrated in FIG. 11, according to another embodiment of the present general inventive concept.

Referring to FIG. 13, first, in operation 1300, filter bank analysis is performed in order to transform a stereo audio signal (such as a speech signal or a music signal) in both the time domain and the frequency domain representations thereof. The operation 1300 may be implemented using a filter bank such as a QMF. Alternatively, in operation 1300, the received stereo audio signal may be transformed into only the frequency domain such as by an FFT or MDCT.

In operation 1310, parameters to upmix a mono signal into a stereo signal at a decoder are extracted from the stereo signal spectra obtained by the transformation performed in operation 1300, and are then encoded. The stereo signal spectra obtained by the transformation performed in operation 1300 are then transformed into a mono audio signal. Examples of the parameters include a channel level difference (CLD) and an inter channel correlation (ICC), as well as others.

In operation 1320, the mono signal obtained in operation 1310 is inversely transformed from the frequency domain to the time domain by performing filterbank synthesis such as by a QMF, an IFFT, or an IMDCT.

In operation 1330, the mono audio signal obtained by the inverse transformation performed in operation 1320 is down-sampled at a predetermined sampling rate, such as a sampling rate suitable to encode the signal according to the CELP encoding technique.

In operation 1340, the low frequency signal down-sampled in operation 1330 is encoded according to, for example, the CELP technique or another process to encode an audio signal in the time domain.

In operation 1150, a high frequency signal of the mono audio signal obtained by the downmixing performed in operation 1310, the high frequency signal corresponding to a band of frequencies that is greater than the predetermined frequency, is encoded using the low frequency signal encoded in operation 1340. The high-frequency signal encoding process 1150 calculates the noise-floor level and generates parameters to reconstruct the spectral envelope of the high-frequency signal using the signal obtained in operation 1310, and the voicing level is calculated using the signal down-sampled in operation 1330, or by using a parameter (such as a pitch lag correlation or a pitch prediction gain) generated in operation 1340 of FIG. 13.

In operation 1360, the parameters encoded in operation 1310, the noise-floor level updated and encoded in operation 1150, the spectral envelope reconstruction parameters output in operation 1150, and a result of the encoding performed in operation 1340 are multiplexed to generate a bitstream.

Figure 14:
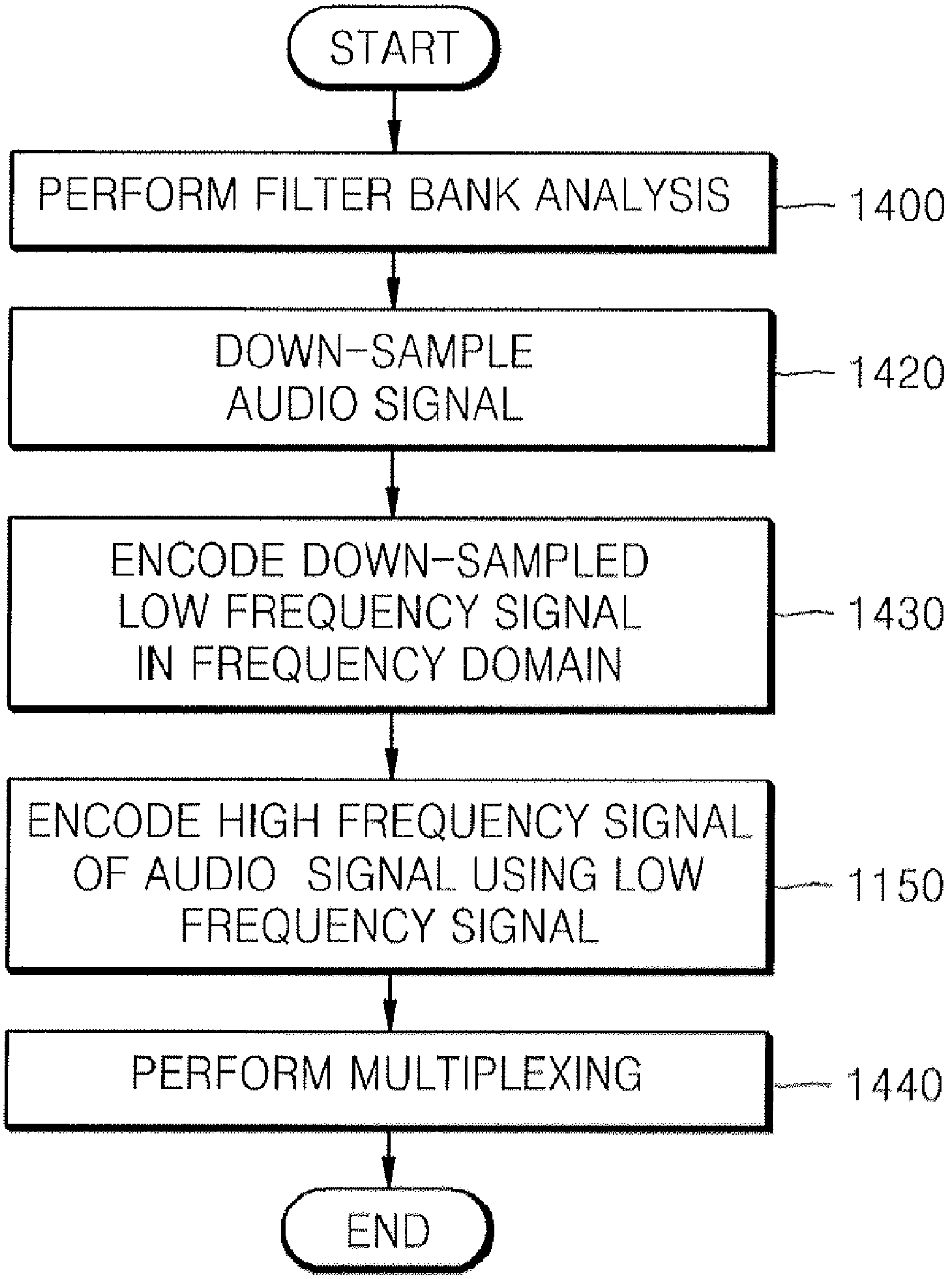
FIG. 14 is a flowchart of a method of encoding an audio signal using the high frequency signal encoding method illustrated in FIG. 11 according to another embodiment of the present general inventive concept.

FIG. 14 is a flowchart of an exemplary method of encoding an audio signal using the high frequency signal encoding process 1150 illustrated in FIG. 11, according to another embodiment of the present general inventive concept.

First, in operation 1400, filter bank analysis is performed to transform an audio signal (such as a speech signal or a music signal) into a representation thereof in both the time domain and the frequency domain. The operation 1400 may be implemented using a filter bank such as a QMF. Alternatively, in operation 1400, the received audio signal may be transformed so that the audio signal can be represented in only the frequency domain such as by an FFT or an MDCT.

In operation 1420, the audio signal is down-sampled at a predetermined sampling rate corresponding to only signals having frequencies that are less than the predetermined frequency.

In operation 1430, the low frequency signal down-sampled in operation 1420 is encoded in the frequency domain. For example, in operation 1430, the low frequency signal down-sampled in operation 1420 is transformed from the time domain to the frequency domain, quantized, and then entropy-encoded.

In operation 1150, a high frequency signal of the audio signal obtained by filter bank analysis process 1400 and corresponding to a band of frequencies that is greater than a predetermined frequency is encoded using a low frequency signal corresponding to a band of frequencies that is less than the predetermined frequency. The calculation of the noise-floor level, which may be performed on the high frequency data of the filter bank analysis operation 1400, the calculation of the voicing level, which may be performed on the low frequency data obtained by the down-sampling operation 1420, the updating of the noise-floor level according to the voicing level, and the generation of the spectral envelope parameters, which may be performed on the high frequency spectral data obtained from the filter bank analysis operation 1400, are performed in operation 1150.

In operation 1440, the noise-floor level updated and encoded in operation 1150, the spectral envelope parameters obtained from operation 1150, and a result of the encoding performed in operation 1430 are multiplexed to generate a bitstream.

Figure 15:
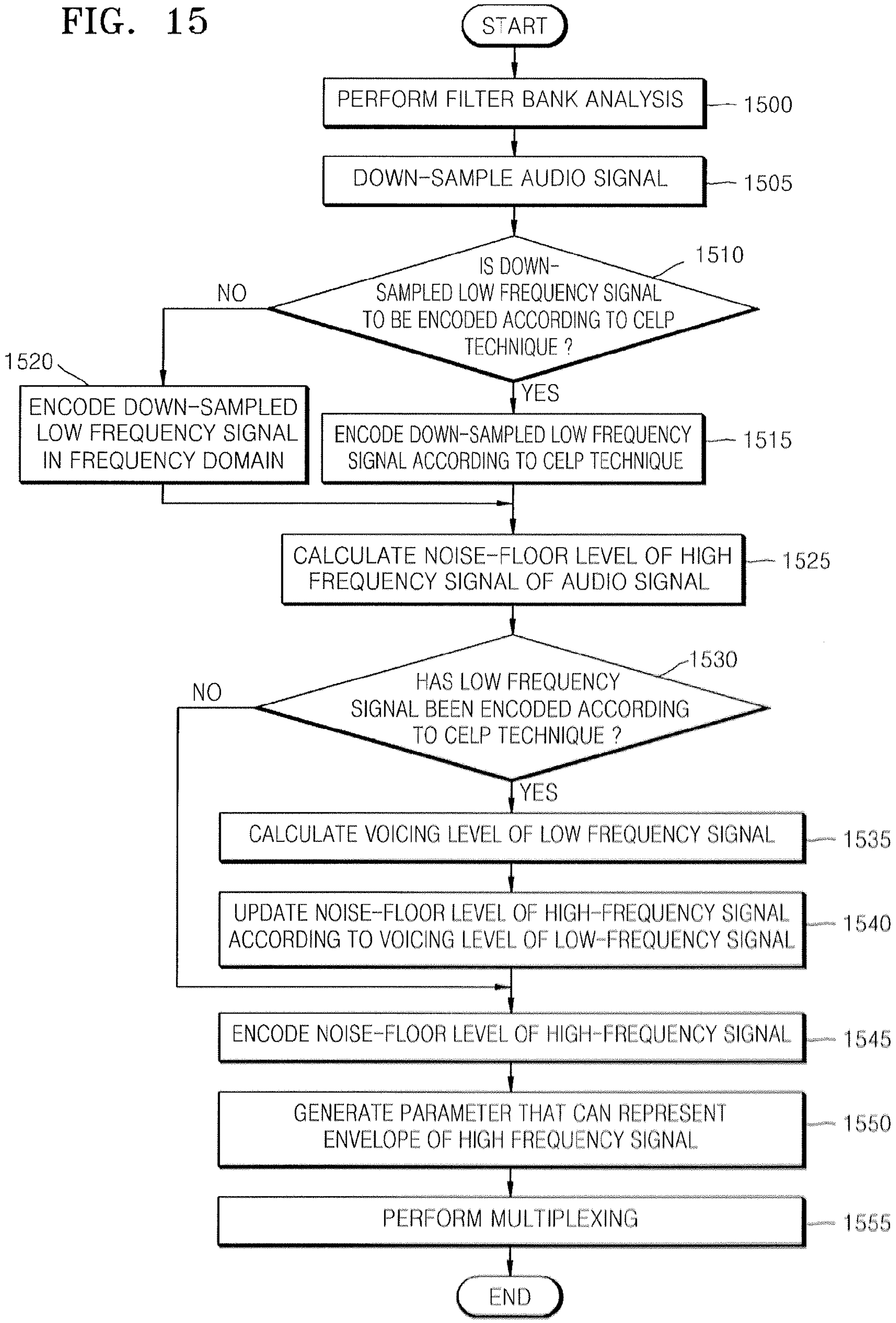
FIG. 15 is a flowchart of a method of encoding an audio signal using the high frequency signal encoding method illustrated in FIG. 11 according to another embodiment of the present general inventive concept.

FIG. 15 is a flowchart of an exemplary method of encoding an audio signal using the high frequency signal encoding process illustrated in FIG. 11, according to another embodiment of the present general inventive concept.

First, in operation 1500, filter bank analysis is performed in order to transform an audio signal (such as a speech signal or a music signal) into a representation thereof in both the time domain and the frequency domain. The operation 1500 may be implemented using a filter bank such as a QMF or a filter bank that performs transformation such as FFT or MDCT.

In operation 1505, the audio signal is down-sampled at a predetermined sampling rate such as a sampling rate suitable to encode the audio signal using the CELP encoding technique.

In operation 1510, it is determined whether the low frequency signal down-sampled in operation 1505 is to be encoded according to the CELP process or a frequency domain encoding process. In operation 1510, side data representing which encoding process is used to encode the sub-bands of the low frequency signal down-sampled in operation 1505 is encoded.

If it is determined in operation 1510 that CELP encoding is selected, the low frequency signal down-sampled in operation 1510 is encoded according to the CELP technique, in operation 1515.

On the other hand, if it is determined in operation 1510 that frequency domain encoding is selected, the low frequency signal down-sampled in operation 1505 is encoded in the frequency domain, in operation 1520. For example, in operation 1520, the low frequency signal down-sampled in operation 1505 may be transformed from the time domain to the frequency domain, quantized, and entropy-encoded.

In operation 1525, the noise-floor level of a high frequency signal of the audio signal obtained by the transformation performed in operation 1500 is calculated.

In operation 1525, a difference between a spectral envelope defined by minimum points on a signal spectrum and a spectral envelope defined by maximum points on the signal spectrum may be calculated as the noise-floor level.

Alternatively, in operation 1525, the noise-floor level may be calculated by comparing the tonality of the high-frequency signal with the tonality of the low frequency signal. When the noise-floor level is calculated in this way in operation 1525, the noise-floor level is calculated so that the greater the tonality of the high-frequency signal is than that of the low-frequency signal, the more noise a decoder can apply to the high-frequency signal.

In operation 1530, it is determined whether the low frequency signal has been encoded according to the CELP encoding method selected in operation 1510.

If it is determined in operation 1530 that the low frequency signal has been encoded according to the CELP encoding method, the voicing level of the low frequency signal may be calculated using the signal down-sampled in operation 1505 or using a parameter generated in the encoding performed in operation 1515, in operation 1535.

In operation 1535, the voicing level may be calculated using the pitch lag correlation or pitch prediction gain generated by the CELP encoding process performed in operation 1515. In operation 1535, the voicing level may be calculated by receiving, for example, the pitch lag correlation or the pitch prediction gain and normalizing to between 0 and 1 the degree to which a voiced sound is included in the low-frequency signal such as by using an open loop pitch correlation according to Equation 1 above.

In operation 1540, the noise-floor level of the high-frequency signal calculated in operation 1525 is updated according to the voicing level of the low-frequency signal calculated in operation 1535. More specifically, in operation 1540, when the voicing level of the low-frequency signal calculated in operation 1535 indicates that the degree of a voiced sound is high, the noise-floor level of the high-frequency signal calculated in operation 1525 is decreased. On the other hand, in operation 1540, when the voicing level of the low-frequency signal calculated in operation 1435 represents that the degree to which the low frequency signal contains a voiced sound is low, the noise-floor level of the high-frequency signal calculated in operation 1525 is not adjusted. For example, in operation 1540, the noise-floor level of the high-frequency signal calculated in operation 1525 is updated according to the voicing level of the low-frequency signal calculated in operation 1535, by using Equation 2 above.

If it is determined in operation 1510 that the method of performing encoding in the frequency domain is selected, the noise-floor level calculated in operation 1525 is encoded, in operation 1545. On the other hand, if it is determined in operation 1510 that the CELP encoding method is selected, the noise-floor level updated in operation 1540 is encoded, in operation 1545.

In operation 1550, parameters to reconstruct the spectral envelope of the high frequency signal are generated. For example, in operation 1550, the energy values of the sub-bands of the high frequency signal may be calculated, as described above.

In operation 1555, a result of the encoding performed in operation 1515 or 1520, information representing which of the CELP encoding process and the frequency domain encoding process was used to encode each of the sub-bands of the low-frequency signal, the noise-floor level encoded in operation 1545, the parameters to reconstruct the spectral envelope of the high frequency signal, and the parameter generated in operation 1550, are multiplexed to generate a bitstream.

Decoding methods according to embodiments of the present general inventive concept will now be described.

Figure 16:
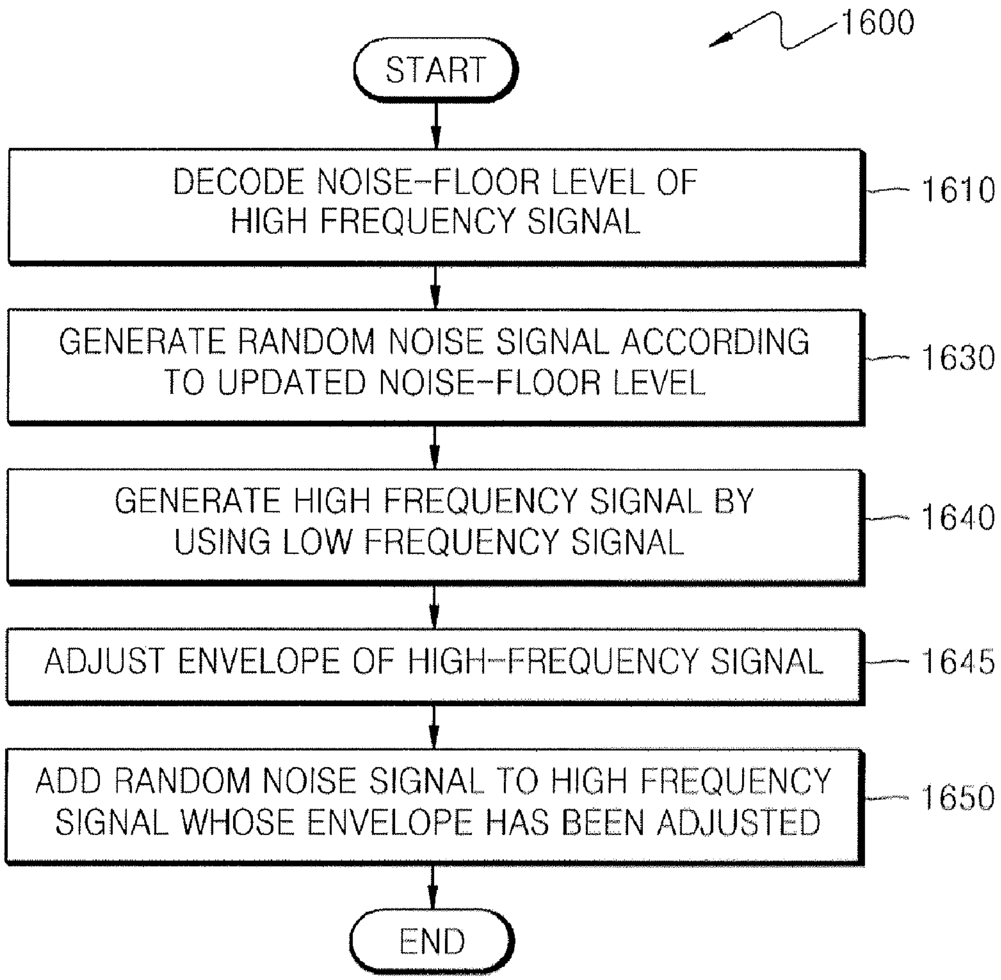
FIG. 16 is a flowchart of a high frequency signal decoding method according to an embodiment of the present general inventive concept.

FIG. 16 is a flowchart of an exemplary high frequency signal decoding process 1600 according to an embodiment of the present general inventive concept.

First, in operation 1610, a noise-floor level of a high frequency signal in a band of frequencies that is greater than a predetermined frequency is decoded.

In operation 1630, a random noise signal is generated in a predetermined manner and controlled according to the noise-floor level decoded in operation 1610.

In operation 1640, a high frequency signal is generated using the low frequency signal obtained by a decoder. For example, in operation 1640, the high frequency signal is generated by replicating the low frequency signal in a high frequency band greater than the predetermined frequency or by folding the low frequency signal into the high frequency band at the predetermined frequency.

In operation 1645, the envelope of the high-frequency signal generated in operation 1640 is adjusted by decoding the spectral envelope parameters of the high frequency signal.

In operation 1650, the random noise signal generated in operation 1630 is added to the high frequency signal whose envelope has been adjusted in operation 1645.

Figure 17:
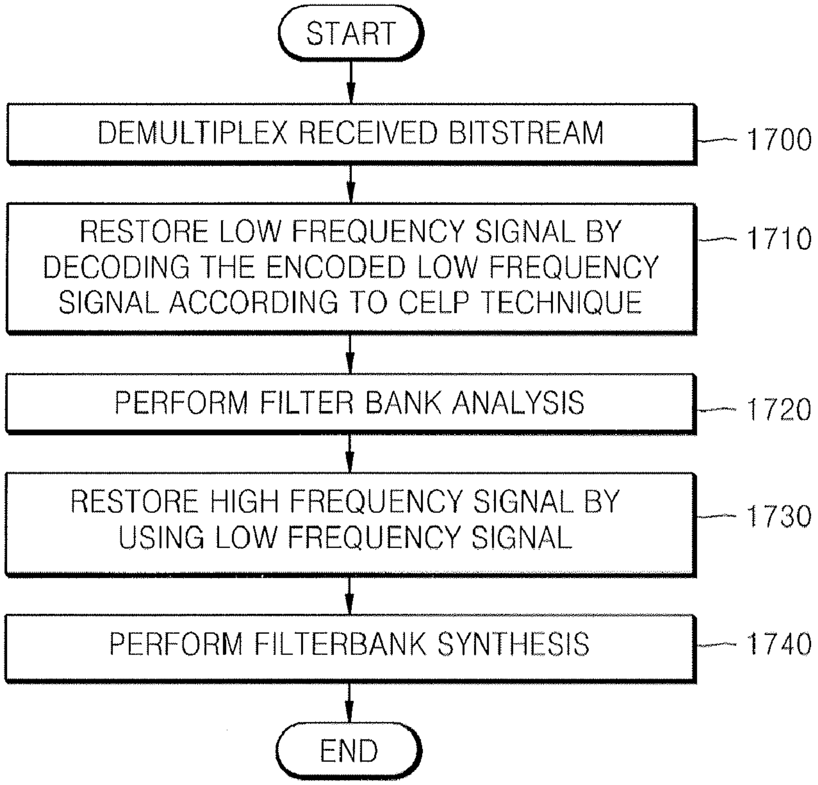
FIG. 17 is a flowchart of a method of decoding an audio signal using the high frequency signal decoding method illustrated in FIG. 16 according to an embodiment of the present general inventive concept.

FIG. 17 is a flowchart of an exemplary method of decoding an audio signal by using the high frequency signal decoding process 1600 illustrated in FIG. 16, according to an embodiment of the present general inventive concept.

First, in operation 1700, a bitstream is received from an encoding end and is demultiplexed. The bitstream to be demultiplexed in operation 1700 may include a low frequency signal in a band of frequencies less than a predetermined frequency encoded according to the CELP technique, the noise-floor level of a high frequency signal in a band of frequencies greater than the predetermined frequency, parameters to reconstruct the spectral envelope of the high frequency signal, and other parameters to use in generating the high frequency signal from the low frequency signal.

In operation 1710, the low frequency signal is decoded according to the CELP technique. However, in operation 1710, it is to be understood that other methods to decode an audio signal in the time domain may be used with the present invention without deviating from the spirit and intended scope of the present general inventive concept.

In operation 1720, filter bank analysis is performed in order to transform the low frequency signal restored in operation 1710 into a representation thereof in both the time domain and the frequency domain. The operation 1720 may be implemented using a filter bank such as a QMF. Alternatively, in operation 1720, the restored low-frequency signal may be transformed using a filter bank that performs a transformation such as FFT or MDCT.

In operation 1600, the high frequency signal is restored using the low frequency signal obtained by the transformation performed in operation 1720, according to the noise-floor level updated according to the voicing level, using the SBR technique described above.

In operation 1740, the low frequency signal obtained by the decoding performed in operation 1710 is synthesized with the high frequency signal restored in operation 1730 from the frequency domain to the time domain, by performing filter-bank synthesis corresponding to a transformation inverse to the transformation performed in operation 1720. In operation 1740, a time series audio signal containing all of the frequency bands thereof are restored by performing filterbank synthesis in operation 1740. The operation 1740 may be implemented using a filter bank (such as, a QMF) to inversely transform a signal represented in both the frequency domain and the time domain into a signal in only the time domain. Alternatively, in operation 1740, a signal represented in only the frequency domain may be inversely transformed into a signal in the time domain by using a filter bank which performs inverse transformation such as IFFT or IMDCT.

Figure 18:
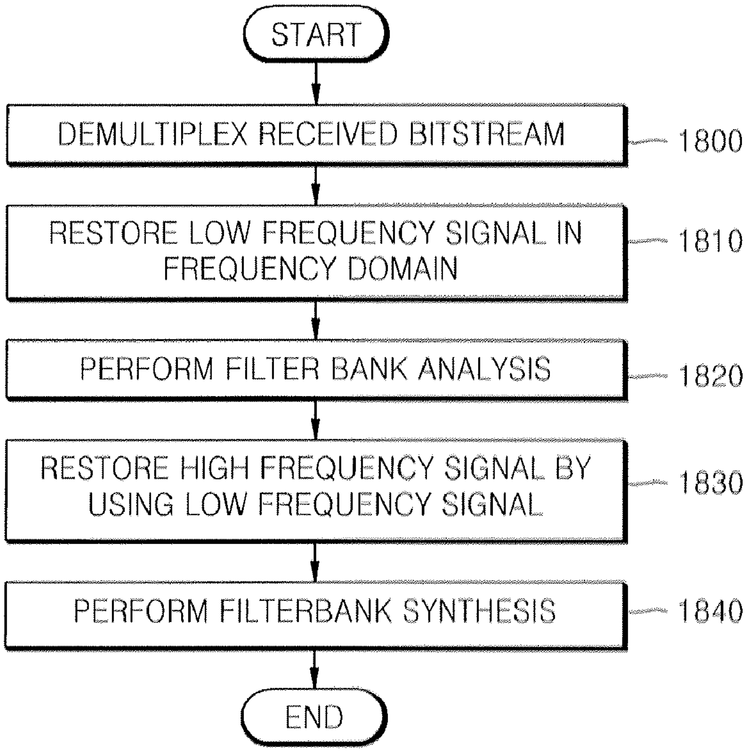
FIG. 18 is a flowchart of a method of decoding an audio signal using the high frequency signal decoding method illustrated in FIG. 16 according to another embodiment of the present general inventive concept.

FIG. 18 is a flowchart of a method of decoding an audio signal by using the high frequency signal decoding process 1600 illustrated in FIG. 16, according to another embodiment of the present general inventive concept.

First, in operation 1800, a bitstream is received from an encoding end and demultiplexed. The bitstream to be demultiplexed in operation 1800 may include an encoded low frequency signal in a band of frequencies less than a predetermined frequency, the noise-floor level of a high frequency signal in a band of frequencies greater than the predetermined frequency, parameters to reconstruct the spectral envelope of the high frequency signal, and other parameters to use in decoding the high frequency signal by using the low frequency signal.

In operation 1810, a low frequency signal in the frequency domain obtained by the demultiplexing performed in operation 1800 is decoded. For example, in operation 1810, the low frequency signal may be restored by entropy-decoding and inversely-quantizing the low frequency signal and inversely transforming the low frequency signal from the frequency domain to the time domain.

In operation 1820, filter bank analysis is performed in order to transform the low frequency signal restored in operation 1810 into a representation thereof in both the time domain and the frequency domain. The operation 1820 may be implemented using a filter bank such as a QMF. Alternatively, in operation 1820, the restored low-frequency signal may be transformed into the frequency domain by using a filter bank that performs transformation such as FFT or MDCT.

In operation 1600, the high frequency signal is restored using the low frequency signal obtained by the transformation performed in operation 1820, according to the noise-floor level updated according to the voicing level, using the SBR technique, as described above.

In operation 1840, the low frequency signal obtained by the decoding performed in operation 1810 is synthesized with the high frequency signal restored in operation 1830 from the frequency domain to the time domain, by performing filter-bank synthesis corresponding to a transformation inverse to the transformation performed in operation 1820. In operation 1840, a time series containing all of the frequency bands of an audio signal are restored by performing the inverse transformation. The operation 1840 may be implemented using a filter bank (such as, a QMF) to inversely transform the signal represented in both the frequency domain and the time domain into a signal in only the time domain. Alternatively, in operation 1840, a signal represented in only the frequency domain may be inversely transformed into a signal in the time domain by using a filter bank which performs inverse transformation such as IFFT or IMDCT.

Figure 19:
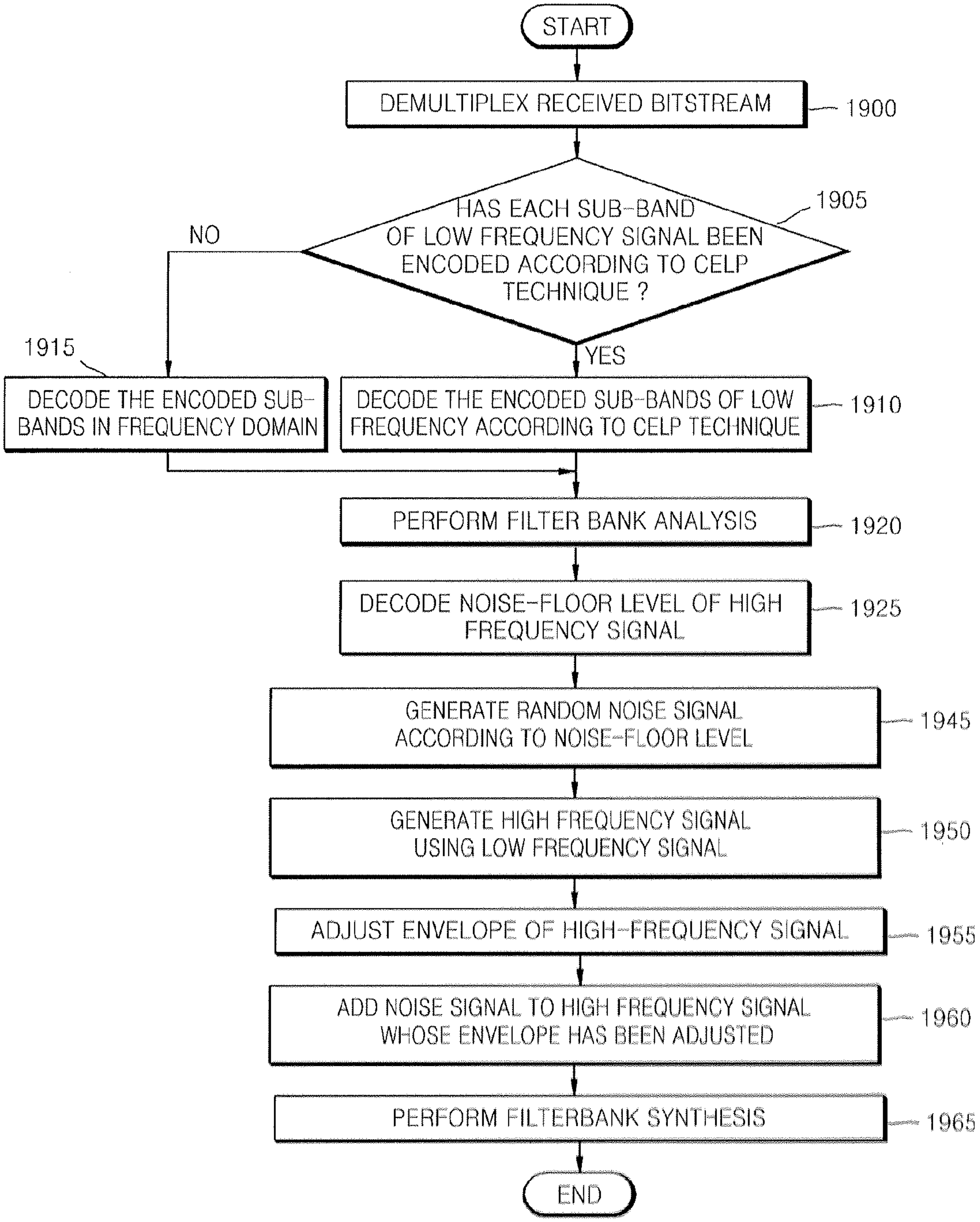
FIG. 19 is a flowchart of a method of decoding an audio signal using the high frequency signal decoding method illustrated in FIG. 16 according to another embodiment of the present general inventive concept.

FIG. 19 is a flowchart of a method of decoding an audio signal by using the high frequency signal decoding method illustrated in FIG. 16, according to another embodiment of the present general inventive concept.

First, in operation 1900, a bitstream is received from an encoding end and demultiplexed. The bitstream to be demultiplexed in operation 1900 may include an encoded low frequency signal contained in a band of frequencies less than a predetermined frequency, the noise-floor level of a high frequency signal contained in a band of frequencies greater than the predetermined frequency, parameters to reconstruct the spectral envelope of the high frequency signal, other parameters to use in decoding the high frequency signal by using the low frequency signal, and information representing which of the CELP encoding process and the frequency domain encoding process was used to encode each of the sub-bands of a low-frequency signal.

In operation 1905, it is determined whether each sub-band of the low frequency signal has been encoded according to either the CELP encoding process or the frequency domain encoding process. The determination is made using the encoded information representing which encoding process was used to encode each of the sub-bands of the low-frequency signal.

If it is determined in operation 1905 that each sub-band of the low frequency signal has been encoded according to the CELP encoding process, the low frequency signal is restored by decoding the sub-bands of the low frequency signal according to the CELP encoding process, in operation 1910.

On the other hand, if it is determined in operation 1905 that each sub-band of the low frequency signal has been encoded by the frequency domain encoding process, the low frequency signal is restored by decoding the sub-bands by the frequency domain decoding process in operation 1915. For example, in operation 1910, the low frequency signal may be restored by entropy-decoding and inversely-quantizing the low frequency signal and inversely transforming the low frequency signal from the frequency domain to the time domain.

In operation 1920, filter bank analysis is performed in order to transform the low frequency signal restored in operation 1910 or 1915 into a representation thereof in both the time domain and the frequency domain. The operation 1920 may be implemented using a filter bank such as a QMF. Alternatively, in operation 1920, the restored low-frequency signal may be transformed by using a filter bank that performs transformation such as FFT or MDCT.

In operation 1925, the noise-floor level of a high frequency signal obtained by the demultiplexing performed in operation 1800 is decoded.

In operation 1945, a random noise signal is generated according to a predetermined manner and controlled according to the decoded noise-floor level.

In operation 1950, the high frequency signal is generated using the low frequency signal decoded in operation 1910 or 1915, such as by replicating the low frequency signal in the high frequency band or by folding the low frequency signal into the high frequency band at the predetermined frequency.

In operation 1955, the envelope of the high-frequency signal generated in operation 1950 is adjusted according to the decoded parameters to reconstruct the spectral envelope of the high frequency signal In operation 1960, the random noise signal generated and controlled in operation 1945 is added to the high frequency signal whose envelope has been adjusted in operation 1955.

In operation 1965, the low frequency signal is synthesized with the high frequency signal from the frequency domain to the time domain, by performing filterbank synthesis corresponding to a transformation inverse to the transformation performed in operation 1920. In operation 1965, the time series of all of the frequency bands of the audio signal are restored by performing the inverse transformation. The operation 1965 may be implemented using a filter bank (such as, a QMF) to inversely transform the signal represented in both the frequency domain and the time domain into a signal in only the time domain. Alternatively, in operation 1965, a signal represented in only the frequency domain may be inversely transformed into a signal in the time domain by using a filter bank which performs inverse transformation such as IFFT or IMDCT.

Figure 20:
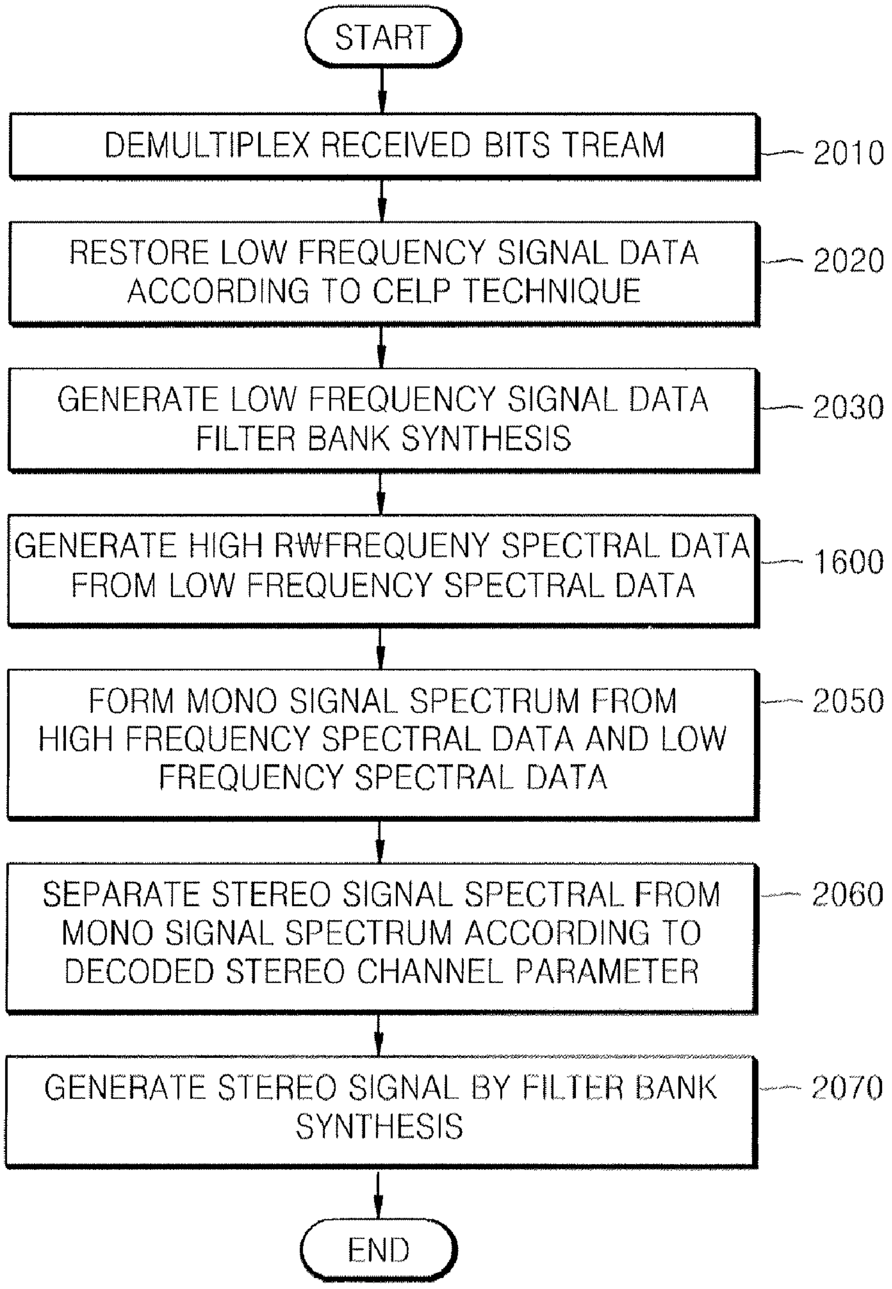
FIG. 20 is a flowchart illustrating an exemplary method of decoding a stereo audio signal using the high frequency decoding method illustrated in FIG. 16 according to another embodiment of the present general inventive concept.

FIG. 20 is a flow chart illustrating an exemplary decoding method according to another embodiment of the present general inventive concept. In operation 2010, a received bitstream is demultiplexed into its various constituent data fields, including an encoded low frequency signal, an encoded high frequency noise floor level, encoded parameters to reconstruct the high frequency spectral envelope, and a stereo channel parameter, such as an ICC or a CLD. In operation 2020, the low frequency signal is restored by, for example, CELP decoding, and in operation 2030, the low frequency signal is transformed into the time/frequency domain, such as by a QMF. In operation 1600, the high frequency data is restored according to the process 1600 described with reference to FIG. 16. In operation 2050, the high frequency spectral data and the low frequency spectral data are combined to form a mono audio signal spectrum, and in operation 2060, the stereo channel spectra are recovered from the mono signal spectrum according to the decoded stereo channel parameter. In operation 2070, the time series stereo signals are generated from the spectra thereof via a filter bank synthesis process.

Figure 21:
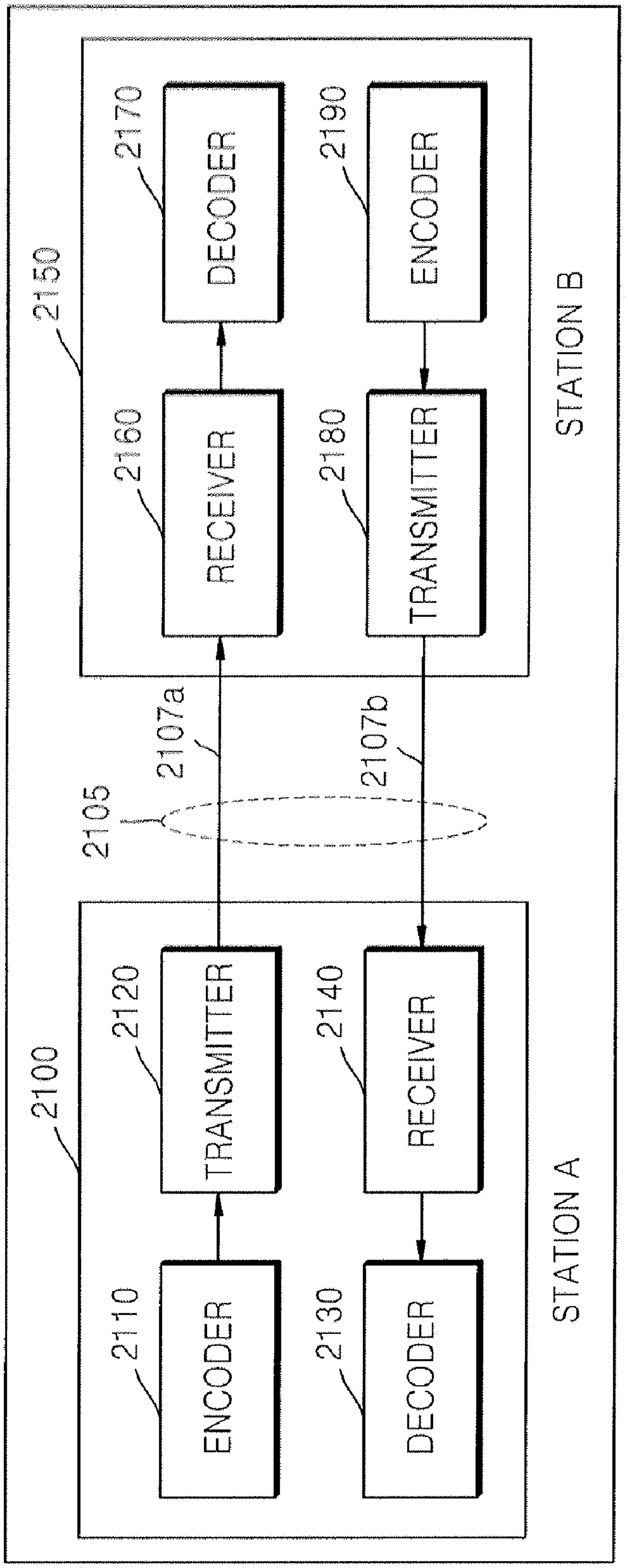
FIG. 21 is a block diagram of a system to convey an audio signal across a transmission medium according to an embodiment of the present general inventive concept.

FIG. 21 illustrates an exemplary system configuration suitable to practice an embodiment of the present general inventive concept. As is illustrated in FIG. 21, the exemplary system includes a first station A 2100 and a second station B 2150. Each of the first station A 2100 and the second station B 2150 may be a communication device, such as, but not limited to, a cellular telephone or a personal computer, communicating one with another over a transmission medium 2105. The transmission medium 2105 may be suitable to convey information on one or more communication channels, such as channels 2107*a* and 2107*b*.

Station A2100 may include an encoder 2110, a transmitter 2120, a decoder 2130, and a receiver 2140. Similarly, station B 2150 may include a receiver 2160, a decoder 2170, a transmitter 2180, and an encoder 2190. The transmitter 2120 and 2180 and the receivers 2140 and 2160 may be any transmitting or receiving device suitable to convert digital time series data to and from a signal, such as, but not limited, to a modulated radio frequency signal, suitable to convey on the communication channels 2107*a*, 2107*b* in transmission medium 2105. The encoders 2110 and 2190 and the decoders 2130 and 2190 may be embodied by an encoding or decoding device suitable to carry out the present general inventive concept, such as, but not limited to, any of the exemplary embodiments described above. Accordingly, an audio signal at one station, for example, station A2100, may be encoded according to the present general inventive concept, transmitted to another station, for example, station B 2150, through transmitter 2120 over, for example, communication channel 2107*a*. At station B 2150, the transmitted signal may be received by the receiver 2160, and decoded according to the present general inventive concept by decoder 2170. Thus, a wide-band audio signal, which has been perceptually adjusted through additive noise of a level corresponding to a voiced sound content of the audio signal at station A 2100, is perceived by a user at station B 2150, even though only a portion of the full spectral content of the audio signal is transmitted from station A 2100.

In addition to the above described embodiments, embodiments of the present general inventive concept can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as to convey carrier waves, as well as through the Internet, for example. Thus, the medium may further carry a signal, such as a resultant signal or bitstream, according to embodiments of the present general inventive concept. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present general inventive concept has been particularly illustrated and described with reference to differing embodiments thereof, it should be understood that these exemplary embodiments should be considered in a descriptive sense only and not to purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available to other similar features or aspects in the remaining embodiments.

Thus, although a few embodiments have been illustrated and described, it would be appreciated by those skilled in the art that changes may be made in these embodiments without departing from the principles and spirit of the general inventive concept, the scope of which is defined in the claims and their equivalents.

What is claimed is:

1. A high frequency signal encoding method comprising:

calculating a noise-floor level of a high frequency signal in a band of frequencies that is greater than a predetermined frequency;

updating the noise-floor level of the high frequency signal by an amount corresponding to an amount of a voiced or unvoiced sound included in a low-frequency signal in a band of frequencies that is less than the predetermined frequency; and encoding the updated noise-floor level.

2. The high frequency signal encoding method of claim 1, wherein in the updating of the noise-floor level, the calculated noise-floor level decreases by an amount corresponding to an increase in the amount of the voiced sound included in the low-frequency signal.

3. The high frequency signal encoding method of claim 1, wherein in the updating of the noise-floor level, the amount of the voiced or unvoiced sound included in the low frequency signal is calculated using one of a pitch lag correlation and a pitch prediction gain.

4. The high frequency signal encoding method of claim 1, wherein in the calculating of the noise-floor level, the noise-floor level is calculated by comparing the tonality of the high-frequency signal with the tonality of the low frequency signal, where the low frequency signal is encoded to recover the high-frequency signal.

5. The high frequency signal encoding method of claim 1, wherein the noise-floor level is a difference between a spectral envelope defined by minimum points on a spectrum of a signal and a spectral envelope defined by maximum points on the spectrum of the signal.

6. A high frequency signal decoding method comprising:
- decoding a noise-floor level of a high frequency signal in a band of frequencies that is greater than a predetermined frequency, the noise-floor level corresponding to an amount of a voiced or unvoiced sound included in a low-frequency signal in a band of frequencies that is less than the predetermined frequency;
- generating a noise signal according to the decoded noise-floor level;
- generating the high frequency signal from the low frequency signal; and
- adding the noise signal to the high frequency signal.

7. The high frequency signal decoding method of claim 6, wherein the generating of the high frequency signal comprises:
- decoding the low frequency signal;
- replicating the low frequency signal in the band of frequencies that is greater than the predetermined frequency;
- decoding at least one parameter to reconstruct a spectral envelope of the high frequency signal; and
- adjusting a spectral envelope of the replicated low frequency signal according to the decoded at least one parameter.

8. The high frequency signal decoding method of claim 7, wherein the decoding of the low frequency signal comprises:
- decoding an indication of an encoding process used to encode the low frequency signal; and
- decoding the low frequency signal by a decoding process corresponding to the decoded indication of the encoding process.

9. The high frequency signal decoding method of claim 8, wherein the decoding of the indication of the encoding process comprises:
- decoding an indication of a code excited linear prediction or entropy encoding.

10. A computer readable recording medium having recorded thereon computer instructions that, when executed by a computer processor, perform a high frequency signal encoding method comprising:
- calculating a noise-floor level of a high frequency signal in a band of frequencies that is greater than a predetermined frequency;
- updating the noise-floor level of the high frequency signal by an amount corresponding to an amount of a voiced or unvoiced sound included in the high frequency signal; and
- encoding the updated noise-floor level.

11. A computer readable recording medium having recorded thereon computer instructions that, when executed by a computer processor, perform a high frequency signal decoding method comprising:
- decoding a noise-floor level of a high frequency signal in a band of frequencies that is greater than a predetermined frequency, the noise-floor level corresponding to an amount of a voiced or unvoiced sound included in a low-frequency signal in a band of frequencies that is less than the predetermined frequency;
- generating a noise signal according to the noise-floor level
- generating the high frequency signal from the low frequency signal; and
- adding the noise signal to the high frequency signal.

12. A high frequency signal encoding apparatus comprising:
- a calculation unit to calculate a noise-floor level of a high frequency signal in a band of frequencies that is greater than a predetermined frequency;
- an updating unit to update the noise-floor level of the high frequency signal in accordance with an amount of a voiced or unvoiced sound included in a low frequency signal in a band of frequencies that is less than the predetermined frequency; and
- an encoding unit to encode the updated noise-floor level.

13. The high frequency signal encoding apparatus of claim 12, wherein the updating unit decreases the calculated noise-floor level as the amount of the voiced sound included in the low frequency signal increases.

14. The high frequency signal encoding apparatus of claim 12, wherein the updating unit calculates the amount of the voiced or unvoiced sound included in the low frequency signal by using one of a pitch lag correlation and a pitch prediction gain.

15. The high frequency signal encoding apparatus of claim 12, wherein the calculating unit calculates the noise-floor level by comparing the tonality of the high-frequency signal with the tonality of the low frequency signal, where the low frequency signal is encoded to reproduce the high-frequency signal.

16. The high frequency signal encoding apparatus of claim 12, wherein the noise-floor level is a difference between a spectral envelope defined by minimum points on a spectrum of a signal and a spectral envelope defined by maximum points on the spectrum of the signal.

17. A high frequency signal decoding apparatus comprising:
- a decoding unit to decode a noise-floor level of a high frequency signal pertaining to a band of frequencies that are greater than a predetermined frequency, the noise-floor level corresponding to an amount of a voiced or an unvoiced sound included in a low-frequency signal in a band of frequencies that is less than the predetermined frequency;
- a high frequency signal decoder to reproduce the high frequency signal from the low frequency signal;
- a noise generation unit to generate a noise signal according to the decoded noise-floor level; and
- a noise addition unit to add the generated noise signal to the reproduced high frequency signal.

18. The high frequency signal decoding apparatus of claim 17, wherein the updating unit decreases the restored noise-floor level as the degree of the voiced sound included in the low frequency signal increases.

19. The high frequency signal decoding apparatus of claim 17, wherein the updating unit calculates the degree of the voiced or voiceless sound included in the low frequency signal by using one of a pitch correlation and a pitch prediction gain.

20. The high frequency signal decoding apparatus of claim 17, wherein the noise-floor level is calculated by comparing the tonality of the high-frequency signal with the tonality of a low frequency signal pertaining to a band of frequencies which are less than the predetermined frequency, where the low frequency signal is used in decoding the high-frequency signal.

21. The high frequency signal decoding apparatus of claim 17, wherein the noise-floor level is a difference between a spectral envelope which is defined by minimum points on the spectrum of a signal and a spectrum envelope which is defined by maximum points on the spectrum of the signal.

22. An audio signal decoder comprising:

a demultiplexer to separate from a bitstream at least an encoded noise floor level and an encoded frequency band of the audio signal other than a frequency band from which the noise floor level was encoded, the noise floor level being of a level determined from a voicing level of the frequency band other than the frequency band from which the noise floor was encoded;

a noise generation unit to generate a noise signal in accordance with the decoded noise floor level;

a decoding unit to decode the frequency band and to generate the other frequency band therewith; and a noise addition unit to add the noise signal to the other frequency band of the audio signal.

23. The decoder of claim 22, wherein the decoding unit comprises:

a linear prediction decoding unit.

24. The decoder of claim 22, wherein the liner prediction decoding unit is a code-excited linear prediction decoding unit.

25. The decoder of claim 22, wherein the decoding unit comprises:

an adaptive decoding unit receiving an indication of one of a linear prediction encoding process and a frequency domain encoding process and to decode the frequency band according to the indicated process.

26. The decoder of claim 25, wherein the frequency decoding process includes entropy coding.

27. The decoder of claim 22, wherein the decoding unit includes a parametric stereo decoding unit.

28. The decoder of claim 27, wherein the frequency band and the other frequency band are decoded as mono channel audio data.

29. A high frequency signal decoding method comprising:

generating a noise signal in units of frequency bands in consideration of energy of frequency spectrum;

generating a high frequency band by using a decoded low frequency band; and adding the noise signal to the high frequency band.

* * * * *